(12) United States Patent
Rehn et al.

(10) Patent No.: US 11,216,771 B2
(45) Date of Patent: Jan. 4, 2022

(54) SYSTEMS AND METHODS FOR MODIFYING WEBPAGES WITH DELIVERY DATE ESTIMATION

(71) Applicant: Coupang Corp., Seoul (KR)

(72) Inventors: Erik Rehn, Seoul (KR); Hyun Sik Eugene Minh, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/076,406

(22) Filed: Oct. 21, 2020

(65) Prior Publication Data

US 2021/0110341 A1   Apr. 15, 2021

Related U.S. Application Data

(63) Continuation of application No. 16/653,581, filed on Oct. 15, 2019, now Pat. No. 10,860,972.

(51) Int. Cl.
*G06Q 10/08* (2012.01)
*G06Q 30/06* (2012.01)
(Continued)

(52) U.S. Cl.
CPC ....... *G06Q 10/0832* (2013.01); *G06F 40/166* (2020.01); *G06Q 10/083* (2013.01);
(Continued)

(58) Field of Classification Search
CPC .................. G06Q 30/0641; G06Q 10/0832
See application file for complete search history.

(56) References Cited

U.S. PATENT DOCUMENTS 7,283,846 B2    10/2007  Spriestersbach et al.
8,635,113 B2 *   1/2014  Borders ............. G06Q 30/0635
                                              705/27.1
(Continued)

FOREIGN PATENT DOCUMENTS

JP    2005-284937 A   10/2005
JP    2018120532 A    8/2018
(Continued)

OTHER PUBLICATIONS

Worldwide Intellectual Property Service (WIPS) Search Report for counterpart Korean Patent Application No. 10-2019-0160955. dated Aug. 13, 2020. 11 pages.
(Continued)

*Primary Examiner* — Scott T Baderman
*Assistant Examiner* — Seung Woon Jung
(74) *Attorney, Agent, or Firm* — Finnegan, Henderson, Farabow, Garrett & Dunner LLP

(57) ABSTRACT

A computerized system for displaying delivery date estimation in a webpage. The system may include a processor and a nontransitory storage medium comprising instructions. When executed by the processor, the instructions may include steps of receiving, from a remote device, a first request for product information, the first request including remote device information and product identification. The steps may also include providing (to a second system) a second request for a delivery date estimate, the second request comprising the remote device information and product identification, receiving (from the second system) the delivery date estimate. The steps may also include generating an electronic message comprising the product information and the delivery date estimate and forwarding (to the remote system) the electronic message.

18 Claims, 19 Drawing Sheets

(51) Int. Cl.
  *G06Q 50/28* (2012.01)
  *G06F 40/166* (2020.01)
  *G06F 3/0481* (2013.01)
  *G06F 40/14* (2020.01)

(52) U.S. Cl.
  CPC ..... *G06Q 30/0625* (2013.01); *G06Q 30/0641* (2013.01); *G06Q 50/28* (2013.01); *G06F 3/04817* (2013.01); *G06F 40/14* (2020.01); *G06Q 10/08* (2013.01)

(56) References Cited

U.S. PATENT DOCUMENTS

| | | | |
|---|---|---|---|
| 10,296,964 | B1 | 5/2019 | Rausch et al. |
| 2014/0310196 | A1 | 10/2014 | Yamamura |
| 2016/0044083 | A1 | 2/2016 | Galloway et al. |
| 2016/0071050 | A1* | 3/2016 | Kaye ................. G06Q 30/0623 705/15 |
| 2017/0024804 | A1 | 1/2017 | Tepfenhart, Jr. et al. |
| 2017/0264579 | A1* | 9/2017 | Fang ..................... G06F 21/554 |
| 2018/0107977 | A1* | 4/2018 | McHale ............. G06Q 30/0609 |
| 2018/0268455 | A1 | 9/2018 | Shiely et al. |
| 2019/0073626 | A1* | 3/2019 | Smith ............. G06Q 10/08355 |
| 2019/0205857 | A1* | 7/2019 | Bell ....................... G06Q 20/02 |
| 2019/0295067 | A1* | 9/2019 | Purves ................. G06Q 20/367 |
| 2021/0089995 | A1* | 3/2021 | Iacono ................. G06Q 10/083 |

FOREIGN PATENT DOCUMENTS

| | | |
|---|---|---|
| KR | 10-2004-0104013 A | 12/2004 |
| KR | 10-2006-0122723 A | 11/2006 |
| KR | 10-2017-0056251 A | 5/2017 |
| KR | 10-1735018 B1 | 5/2017 |
| KR | 10-2017-0061419 A | 6/2017 |

OTHER PUBLICATIONS

Notice of Preliminary Rejection issued by the Korean Patent Office for Korean Patent Application No. 10-2019-0160955, dated Nov. 25, 2020. (17 pages).

Examination Report issued by the Australian Patent Office for Australian Patent Application No. 2020264356, dated Jan. 5, 2021. (6 pages).

International Search Report Written Opinion for PCT Application No. PCT/IB2020/058782, dated Jan. 4, 2021. (12 pages).

Examination Notice from Government of the Hong Kong Special Administrative Region Intellectual Property Department dated Oct. 21, 2021, for counterpart Hong Kong Application No. 22020016818.9 (5 pages).

* cited by examiner

1500

```
<html>
  <head>
    <title></title>
    <script type="text/javascript">
      function txnfn(){
        //GET DOCUMENT TYPE;
          if(document.getElementById("txnType").value=='SEARCH'){
          x=1;
          }else{
          if(document.getElementById("txnType").value=='SINGLE DISPLAY'){
            x=2
        }
      }
      //GENERATE TEXT BOX WITH DATE FOR DELIVERY ESTIMATE
      function   txn40()
      {
        WHEN x=1    var dt = document.getElementById("txndt").value;
        var TEXTBOX = new Date(dt);
            //CHANGE FOR DEFAULT FORMAT
          document.getElementById("duedt").value =
              dat.toLocaleFormat('%d-%b-%Y');
      }
    </script>
  </head>
  <body>
      PageType: <select name="search" id="display;">
      <option value="x=1">MODIFY FOR SEARCH</option>
      <option value="x=2">MODIFY FOR DISPLAY</option>
    </select>
    <br/><br/>
      //ADD OR MODIFY WEBPAGE
    Delivery date:<input id ="txndt" type="date"
    <br/><br/>
        <div id="duedtdiv">
    Timer date:<input id ="duedt" type="date" name ="due_date" readonly/>
        </div>
  </body>
</html>
```

SYSTEMS AND METHODS FOR MODIFYING WEBPAGES WITH DELIVERY DATE ESTIMATION

CROSS-REFERENCE TO RELATED APPLICATIONS

This application is a continuation of U.S. application Ser. No. 16/653,581, filed Oct. 15, 2019. The disclosure of the above-referenced application is expressly incorporated herein by reference in its entirety.

TECHNICAL FIELD

The present disclosure generally relates to computerized systems and methods for determining a delivery date estimation and modifying webpages. In particular, embodiments of the present disclosure relate to inventive and unconventional systems and methods for modifying webpages to include and/or update delivery estimation for retail products.

BACKGROUND

Online shoppers frequently make purchasing decisions based on the tentative arrival dates of goods they may purchase. For example, an online customer may be willing to buy a product online if it arrives one day from ordering, but if the product would arrive later (e.g., one week from ordering) the customer may prefer to go to a brick-and-mortar store. Therefore, when doing online shopping customers may prefer to get estimated delivery dates and times within the same webpage, and as soon as possible, to facilitate their purchasing decisions. Further, some retailers may attempt to incentivize online purchases by "promising" a delivery date and time. For example, some online retailers may "promise" the product will arrive within 24 hours to encourage online purchases over brick-and-mortar options.

However, determining estimated delivery dates for online shopping is a complex technical problem. To calculate a tentative delivery date accurately, retailers need to capture information from multiple parties (e.g., from sellers and also shipping agents), forecast interactions, and take into account a myriad of variables and alternatives. Moreover, delivery date calculations are time sensitive and need to be executed very quickly, even in milliseconds. Retailers need to determine the estimated delivery dates quickly to present information to online customers, capture their attention, and incentivize sales. Furthermore, the estimated delivery must be accurate because poor estimation may result in client dissatisfaction and/or penalties to the retailer—if the retailer is making delivery promises. The combined requirements of preforming complex calculations, quickly, precisely, and using multi-sourced data, results in a highly complicated technical problem for online retailers.

Moreover, delivery estimates should be seamlessly displayed in prospective costumer devices. The delivery estimate calculations should not undermine customer's experience when navigating on the retailer's webpages. For example, if delivery estimate calculations cause webpage rendering delays or inaccuracies, customers may find the webpage unreliable or untrusty. Similarly, if a customer finds webpages fail to load properly or give inaccurate information, the customer may prefer to use a different webpage or brick-and-mortar stores. Hence, displaying delivery estimate calculations in a webpage has the added complexity of assuring smooth client interaction and seamless integration with other online systems.

The disclosed systems and methods for modifying webpages with delivery date estimation address one or more of the problems set forth above and/or other problems in the prior art.

SUMMARY

One aspect of the present disclosure is directed to a computerized system for displaying delivery date estimation in a webpage. The system may include at least one processor and at least one nontransitory storage medium comprising instructions that, when executed by the at least one processor, cause the at least one processor to perform steps. The steps may include receiving (from a remote device) a first request for product information, the first request comprising remote device information and product identification. The steps may also include providing (to a second system) a second request for a delivery date estimate stored in memory, the second request comprising the remote device information and product identification. The steps may further include receiving (from the second system) the delivery date estimate, generating an electronic message comprising the product information and the delivery date estimate, and forwarding (to the remote system) the electronic message.

Another aspect of the present disclosure is directed a computer-implemented method for displaying delivery date estimation in a webpage. The method may include receiving (from a remote device) a first request for product information, the first request comprising remote device information and product identification. The method may also include providing (to a fulfillment system) a second request for a delivery date estimate stored in memory, the second request comprising the remote device information and product identification. The method may additionally include receiving (from the fulfillment system) the delivery date estimate, generating an electronic message comprising the product information and the delivery date estimate, and forwarding (to the remote system) the electronic message.

Yet another aspect of the present disclosure is directed to a non-transitory computer-readable medium storing instructions that, when executed by a processor, perform operations for displaying delivery date estimation in a webpage. The operations may include receiving (from a remote device) a first request for product information, the first request comprising remote device information and product identification. The operations may also include providing (to a fulfillment system) a second request for a delivery date estimate stored in memory, the second request comprising the remote device information and product identification. The operations may additionally include receiving (from the fulfillment system) the delivery date estimate, generating an electronic message comprising an HTML file specifying the product information and the delivery date estimate, and instructions to modify the webpage including: (1) identifying the webpage's type, the webpage's type being one of a search result page, a single detail page, a cart page, or an order page; and (2) modifying the webpage based on the webpage's type. The operations may also include forwarding, to the remote system, the electronic message.

Other systems, methods, and computer-readable media are also discussed herein.

BRIEF DESCRIPTION OF THE DRAWINGS

FIG. 15 is an exemplary source code of a script configurable to generate or modify a webpage with delivery date estimates.

DETAILED DESCRIPTION

Figure 1A:
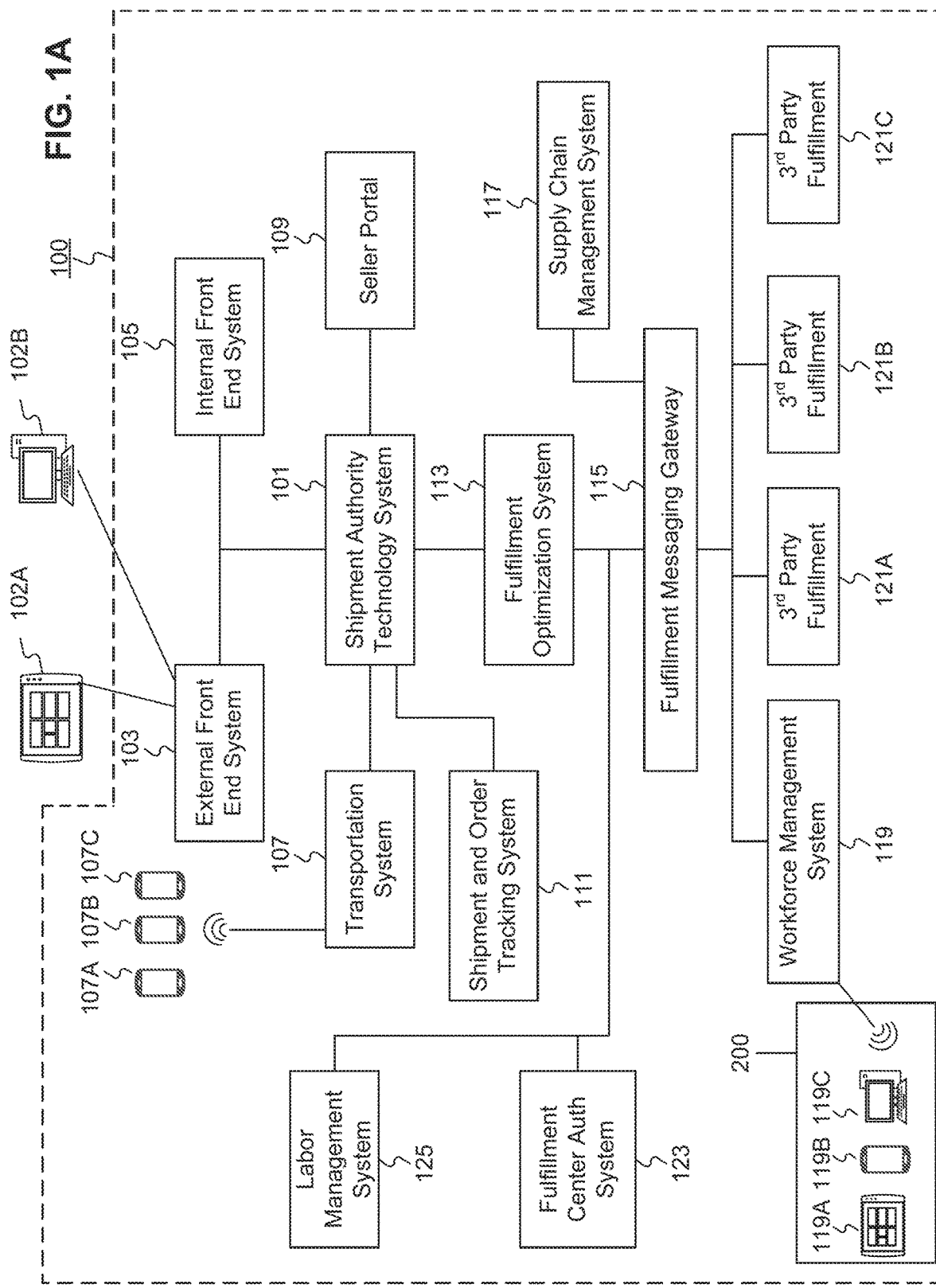
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for modifying or generating webpages with delivery date estimations. The disclosed systems and methods enable automated and optimized calculations for delivery date estimation. The disclosed systems and methods also allow transmitting delivery date estimation while minimizing bandwidth utilization. For example, the disclosed systems may be configured to send compressed HTML or JavaScript files to update a webpage, without resending iterative information. Moreover, the disclosed systems and methods may enhance accuracy of the delivery date estimation calculations by concurrently gathering data from multiple sources to dynamically produce delivery date estimations as clients navigate in a webpage. Further, the disclosed system and methods may automatically generate scripts and/or source code to generate or modify webpages that present the calculation results to users.

Embodiments of the disclosed systems and methods may be directed to computer operation improvements. In particular, disclosed systems and methods may result in dynamically produced multi-source hybrid webpages that improve the technical field of calculating and displaying webpages for online shoppers. The disclosed systems and methods may dynamically generate a webpage that combines information from fulfillment centers, shipping agents, and customer accounts, to generate a hybrid webpage that shows product information and delivery date estimates based on customer account information. For example, the disclosed systems may produce dynamic hybrid webpages that combine information from the retailer (e.g., the availability and location of products), information from the shipping agent (e.g., shipping routes and schedules), and information from the customer to (e.g., shipping preferences and postal code). Such multi-sourced arrangement of information may be used to generate a hybrid webpage that displays products, delivery date estimates, promised delivery dates, and purchasing options.

Moreover, the disclosed systems and methods may reduce network congestion while transmitting and/or updating delivery date estimates. Delivery estimates may be dynamically produced as a user navigates in a retailer's webpage. However, to minimize network congestion, the delivery estimates may be sent as scripts that modify the webpage rather than rendering a new webpage. Instead of sending all information to render the complete webpage, in the disclosed systems and methods smaller scripts or files may be exchanged between different portions of the system to reduce network congestion. Further, the disclosed systems and methods may include timers that automatically remove estimation calculations that are no longer required or that have expired, to save computational resources and network bandwidth.

Furthermore, the disclosed systems and methods improve the adaptability of webpages to dynamically display estimated delivery dates. The disclosed systems and methods may facilitate updating webpages by having dynamic text boxes that may be specifically updated as the delivery estimates are calculated. Such configuration may improve user experience when navigating in a webpage, allowing users to see product and delivery information being dynamically updated.

Reference will now be made in detail to the disclosed embodiments, examples of which are illustrated in the accompanying drawings.

FIG. 1A shows a schematic block diagram of system 100 illustrating an exemplary embodiment of a system comprising computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may comprise one or more of these systems, while in another aspect, external front-end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front-end system 103.

Figure 1D:
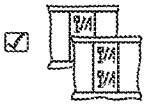
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart.

In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may comprise one or more of these systems, while in another aspect, internal front-end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front-end system 103, SAT system 101, shipment and order tracking system 111). In other embodiments, FO system 113 may receive electronic requests from one or more systems (e.g., external front-end system 103, SAT system 101, shipment and order tracking system 111) and calculate the PDD on demand. In yet other embodiments, FO system 113 may determine PDD as a use navigates through one of the webpages. Processes for calculation and transmission of PDD by FO system 113 are further described in connection to FIG. 9.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
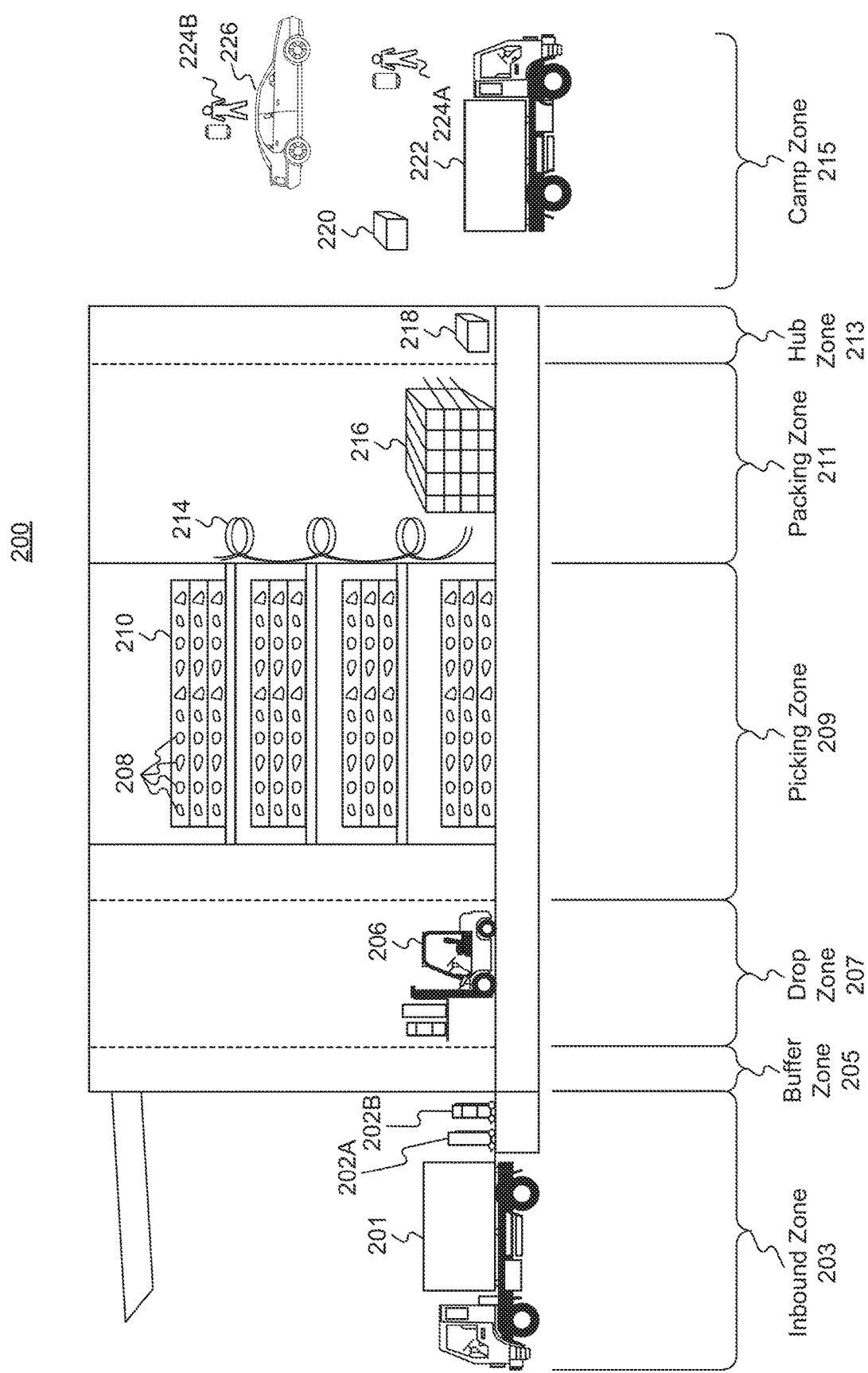
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
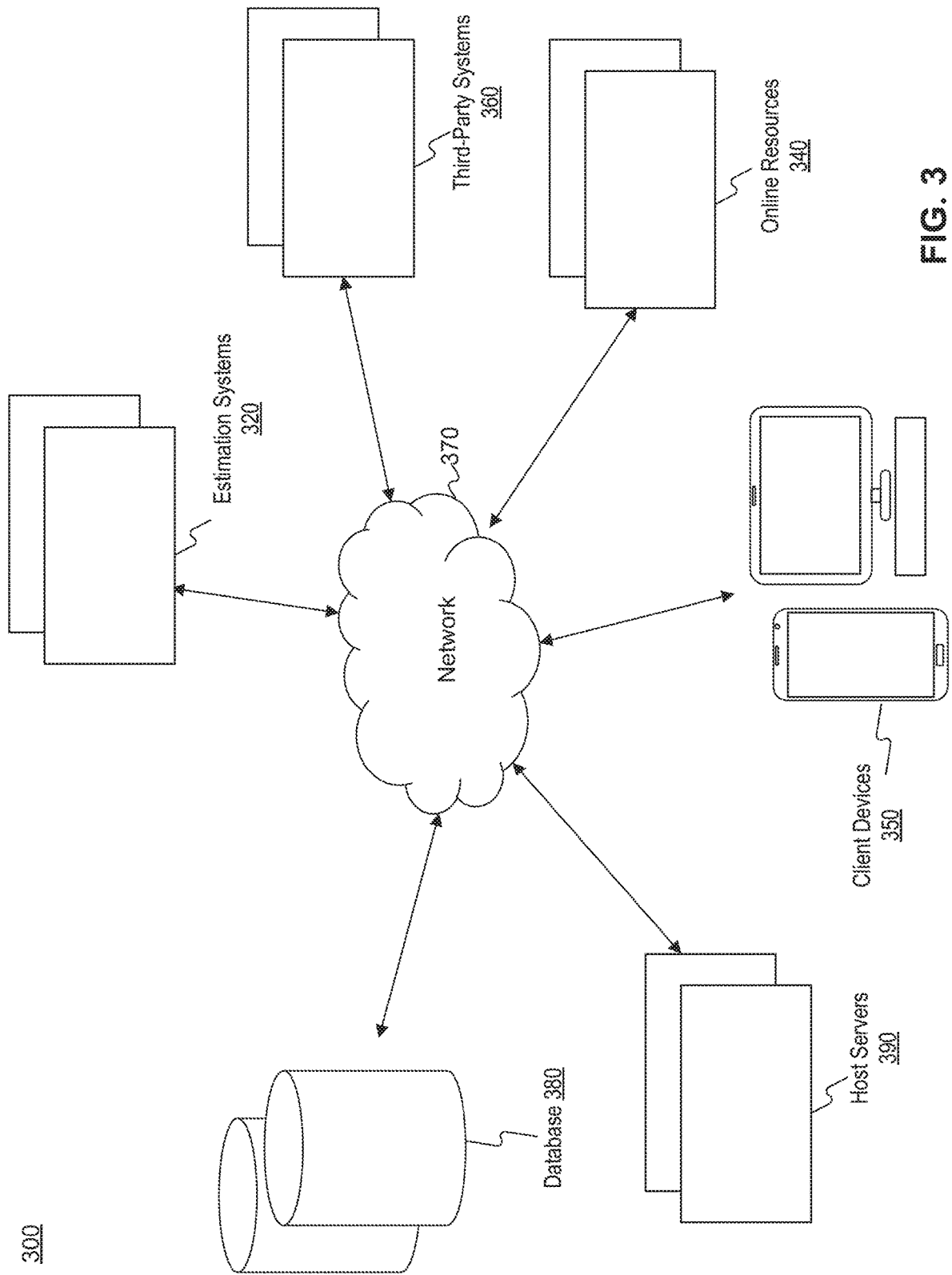
FIG. 3 is a schematic block diagram of an exemplary system, consistent with disclosed embodiments.

FIG. 3 is a block diagram of an exemplary system 300, consistent with disclosed embodiments. In system 300 a delivery date estimation system 320 may process product requests from real-time client device's data streams to, for example, determine a PDD or estimated delivery for a product. The system may also generate instructions to display or modify a webpage to include the estimated delivery data. System 300 may include estimation systems 320, online resources 340, client devices 350, third-party systems 360, client systems 390, and database 380. In some embodiments, as shown in FIG. 3, components of system 300 may be connected to a network 370. However, in other embodiments components of system 300 may be connected directly with each other, without network 370. For example, database 380 may be directly coupled to estimation systems 320.

In some embodiments, estimation systems 320 may be implemented with one or more of the components of system 100 (FIG. 1A). For example, estimation systems 320 may include SAT system 101, external front-end system 103, FO system 113, SCM system 117, and/or WMS 119 (FIG. 1A). In other embodiments, estimation systems 320 may be implemented with one or more independent servers configured to perform operations for estimating a delivery date, generating a PDD, and/or updating or generating webpages for client devices 350.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as, for example, Apple Push Notification Service, Azure Mobile Services, or Google Cloud Messaging. In such embodiments, online resources 340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102 (FIG. 1A) and be operated as part of system 100. In other embodiments, however, client devices 350 may be independent from system 100. Client devices 350 may include one or more processors configured to execute software instructions stored in memory, such as memory included in client devices 350, to perform operations to implement the functions described below. For example, client devices 350 may be configured to display graphical user interfaces in webpages that include delivery date estimates generated by estimation systems 320. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

Figure 4:
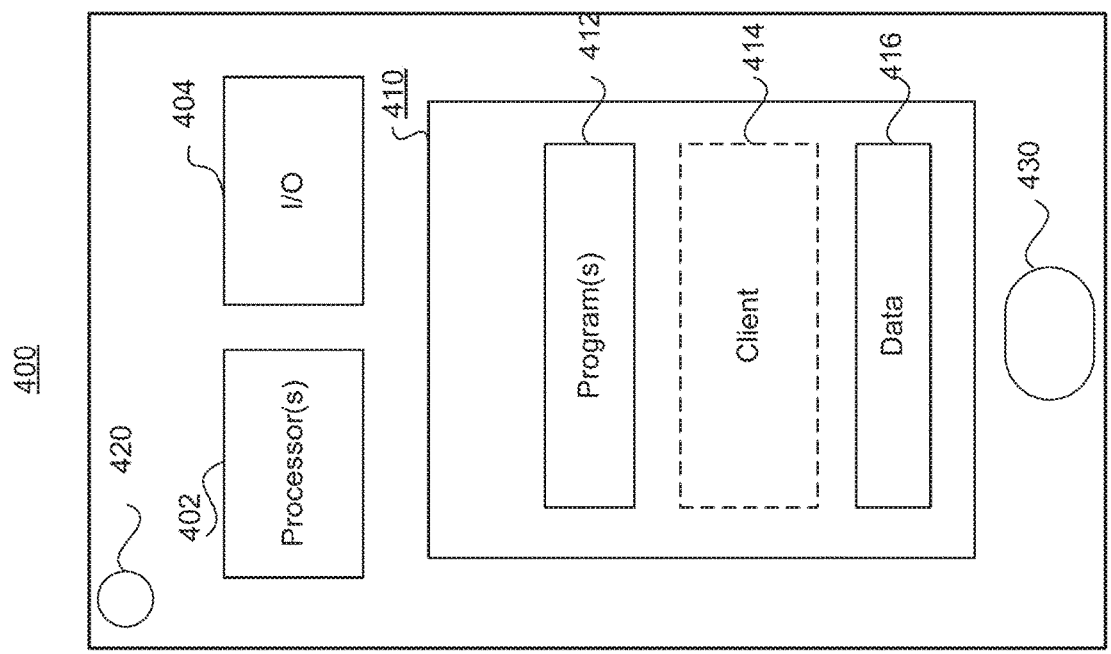
FIG. 4 is a block diagram of an exemplary client device, consistent with disclosed embodiments.

In some embodiments, as further disclosed in connection to FIG. 4, client devices 350 may run applications specifically configured to interact with estimation systems 320. Moreover, client devices 350 may store one or more accounts. For example, client devices 350 may store information about a customer's delivery preferences, the customer's location, customer account, and customer identification.

The disclosed embodiments are not limited to any particular configuration of client devices 350. For instance, a client device 350 may be a mobile device that stores and executes mobile applications to perform operations that provide functions offered by estimation systems 320 and/or online resources 340. In certain embodiments, client devices 350 may be configured to execute software instructions relating to location services, such as GPS locations. For example, client devices 350 may be configured to determine a geographic location and provide location data and time stamp data corresponding to the location data. Client devices 350 are further described in connection with FIG. 4.

Database 380 may include one or more computing devices configured with appropriate software to perform operations consistent with providing estimation systems 320 data for calculating and/or retrieving estimated delivery dates. Database 380 may include, for example, Oracle™ databases, Sybase™ databases, or other relational databases or non-relational databases, such as Hadoop™ sequence files, HBase™, or Cassandra™. Database 380 may include computing components (e.g., database management system, database server, etc.) configured to receive and process requests for data stored in memory devices of the database(s) and to provide data from the database(s).

While database 380 are shown separately, in some embodiments database 380 may be included in, or otherwise related to estimation systems 320 or online resources 340.

Database 380 may be configured to collect and/or maintain data associated with user accounts or products to facilitate delivery date or PDD estimations. For example, database 380 may store information about user profiles for users of system 300. Database 380 may also store previously calculated delivery dates for a specific product and corresponding postal code, to quickly respond to delivery date estimation requests that have similar product and postal code pair. Database 380 may collect the data from a variety of sources, including, for instance, online resources 340 or third-party systems 360. Further, database 380 may include information about client devices 350 operating systems. Within user account information, database 380 may include operating system information to generate or update webpages. Database 380 are further described below in connection with FIG. 5.

In some embodiments, third-party systems 360 may include one or more elements of system 100. For example, third-party systems 360 may include 3PL systems 121A-121C. Additionally, or alternatively, third-party systems 360 may include one or more servers or storage services provided by an entity related to estimation systems 320, such as a provider of services or a fulfillment center. Third-party systems 360 may also be connected to system 300 via network 370, but in other embodiments third-party systems 360 may include direct connections with some elements of system 300. For example, to minimize delays or network congestion third-party systems 360 may be connected in a private network with estimation systems 320. Further, third-party systems 360 may be configured to provide and/or request information from estimation systems 320, or other elements of system 300. In some embodiments, while third-party systems 360 may also be coupled to network 370, they may not be clients of estimation systems 320. Instead, third-party systems 360 may include systems that include information of users or clients of estimation systems 320. For example, third-party systems 360 may include servers of delivery contractors such as FedEx®, which may be used by estimation systems 320 when a product delivery involves a third-party contractor. Similarly, if a product is not available within fulfillment centers in system 100 (FIG. 1), third-party systems 360 may perform their own calculations and inform estimation systems 320 about the tentative delivery date or PDD.

Client systems 390 may include one or more servers or storage services in communication with estimation systems 320 via network 370. In some embodiments, client systems 390 may send order requests for product information to estimation systems 320, which may process in real-time the order requests using disclosed systems and methods. For example, client systems 390 may transmit data streams with product information requests, which may include item info, a postal code of a customer, and a delivery address, among other parameters. In such embodiments, the orders transmitted from client systems 390 may further include user information, location, transaction amount, IP address, and/or currency. Further, client systems 390 may operate Windows®, macOS®, or Linux® operating systems.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Referring now to FIG. 4, there is shown a block diagram of an exemplary client device 350 (FIG. 3), consistent with disclosed embodiments. In some embodiments, client devices 350 may include user devices 102 (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit, and the like based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also store data 416 that may be used by estimation systems 320 to assign deliveries estimates or PDDs to the client device.

In certain embodiments, memory 410 may store instructions for accessing or sending requests to estimation systems 320. For example, memory 410 may include an application that communicates with estimation systems 320 via TCP/IP. Moreover, other software components may be configured to request information from estimation systems 320 or determine the location of client devices 350. For instance, these software instructions, when executed by processor(s) 402, may process information to display an estimated delivery date or PDD in a webpage. The software instructions may also implement scripts to modify webpages being displayed in client devices 350.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with estimation systems 320.

In some embodiments, client devices 350 may also include a camera 420 that capture images and may be used for identification of a product that the user wants. Such identification may trigger the delivery date estimation or PDD calculation. Additionally, or alternatively, client devices 350 may include a fingerprint sensor 430 that allows users to unlock client devices 350 to access their accounts, send request for information, and purchase items. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
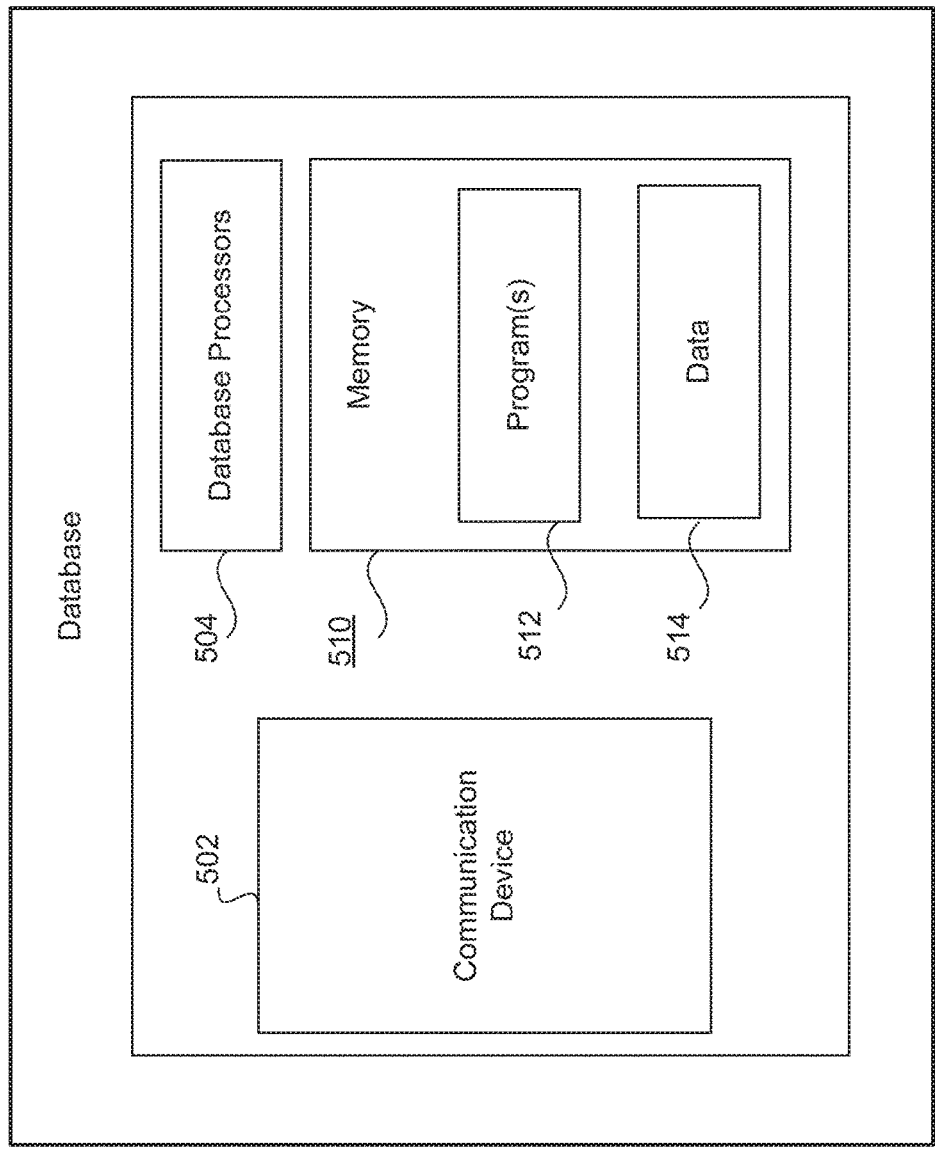
FIG. 5 is a block diagram of an exemplary database, consistent with disclosed embodiments.

Referring now to FIG. 5, there is shown a block diagram of an exemplary database 380 (FIG. 3), consistent with disclosed embodiments. In some embodiments, database 380 may be included in elements of system 100. For example, database 380 may be part of the FO system 113 or the WMS 119 (FIG. 1A).

Database 380 may include a communication device 502, one or more database processors 504, and database memory 510 including one or more database programs 512 and data 514. Database 380 may include NoSQL databases such as HBase, MongoDB™ or Cassandra™. Alternatively, database 380 may include relational databases such as Oracle, MySQL and Microsoft SQL Server.

In some embodiments, database 380 may take the form of servers, general purpose computers, mainframe computers, or any combination of these components. In some embodiments, database 380 are included within other elements of system 300, such as estimation systems 320. Other implementations consistent with disclosed embodiments are possible as well.

In some embodiments, database 380 may include both non-relational and embedded databases. For example, database 380 may include a non-relational database, such as an Hbase, and an embedded database, such as a RocksDB (e.g., a key-value store database).

Communication device 502 may be configured to communicate with one or more components of system 300 or system 100, such as online resources 340, estimation systems 320, or SCM system 117. In particular, communication device 502 may be configured to provide estimation systems 320 order information, user preferences and privileges, and/or historic previous estimations for similar postal codes and products inquiries.

The components of database 380 may be implemented in hardware, software, or a combination of both hardware and software. For example, although one or more components of database 380 may be implemented as computer processing instruction modules, all or a portion of the functionality of database 380 may be implemented instead in dedicated electronics hardware.

Database memory 510 may include programs 512, which may include instructions to update webpages based on delivery estimates or PDDs received or generated by estimation systems 320. Further, database memory 510 may include instructions for communications between elements of system 300. For example, database memory 510 may include instructions for communications between client devices 350 and estimation systems 320. Further programs 512 may include instructions to store information in real-time as it is processed by estimation systems 320.

Data 514 may also be data associated with webpages, such as online resources 340, or user accounts from client devices 350. Data 514 may include, for example, information relating to previous delivery estimation calculations or previous PDDs associated with postal codes. Data 314 may also include content files and accumulation variables to evaluate capacity of fulfillment centers and order availability.

Figure 6:
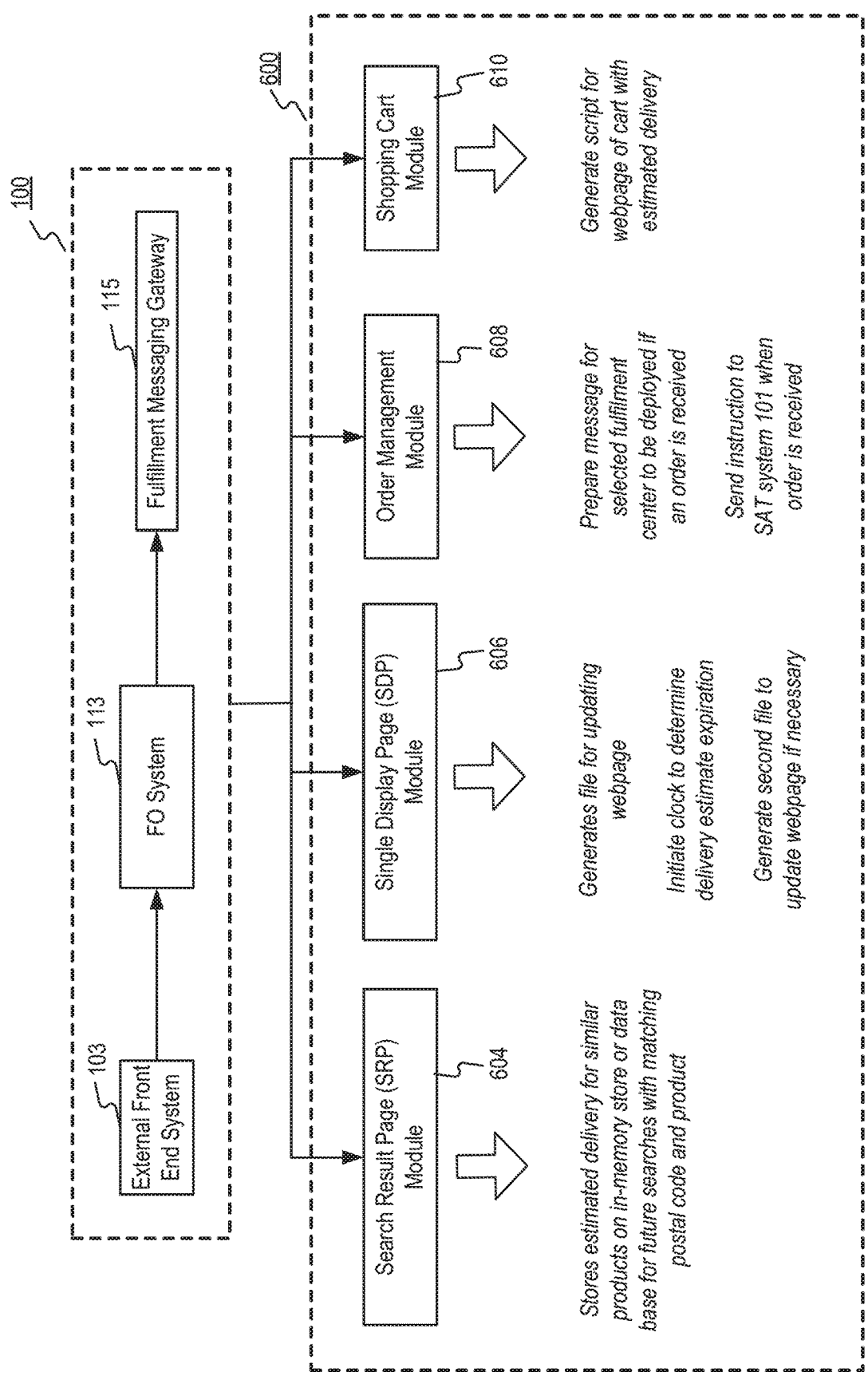
FIG. 6 is a process flow diagram of an exemplary delivery estimation distribution to online modules, consistent with disclosed embodiments.

FIG. 6 is a process flow diagram of an exemplary delivery estimation distribution, consistent with disclosed embodiments. In some embodiments, system 100, or portions of system 100, may perform calculations to determine an estimated delivery. System 100 may then transmit PDD information to online modules 600 that generate webpages for client interaction.

In some embodiments, as shown in FIG. 6, elements of system 100 may communicate with each other to generate an estimated delivery date. For example, external front-end system 103 may receive a request for a delivery estimate from user devices 102A-102B (FIG. 1A). The request may then be transmitted to an FO system 113 that may determine a selected fulfillment center and an estimated delivery time, as further described in connection to FIG. 9. Then FO system 113 may send the selected fulfillment center and estimated delivery date to fulfillment messaging gateway 115. In turn fulfillment messaging gateway 115 may send the information to the online modules 600.

Online modules 600 may include a search result page (SRP) module 604, a single display page (SDP) module 606, an order management module 608, and a shopping cart module 610. Each one of the modules may generate different webpages for display to consumers. For example, SRP module 604 may generate result pages (like the one described in connection with FIG. 1B) for user devices 102, while SDP module 606 may generate single product webpages (like the one described in connection with FIG. 1C) for user devices 102. Similarly, order management module 608 may generate or update order pages (like the one described in connection with FIG. 1E) while shopping cart module 610 may generate or update cart pages (like the one described in connection with FIG. 1D). Therefore, each one of online modules 600 may incorporate the estimated delivery date or PDD received from system 100 in the webpages that are been displayed to customers.

Moreover, each one of online modules 600 may perform different operations when receiving estimated delivery dates. For example, after receiving a PDD SRP module 604 may store PDDs and/or estimated delivery dates for similar products in cache memory for future searches. Then, when SRP module 604 receives a search request—within the expiration time associated with the PDD or estimated delivery—that has the same or similar postal code and product, SRP module 604 does not need to query system 100. Instead, SRP module 604 may immediately update the search webpage based on previous information. Conversely, SDP module 606 may generate files for updating product webpages when receiving a PDD or delivery estimate. For example, SDP module 606 may generate a JavaScript or HTML file that updates the product webpage. Further SDP module 606 may initiate a clock or timer to determine if the delivery date estimation has expired. In such embodiments, SDP module 606 may generate a second file to update the single product webpage if necessary (e.g., the estimated delivery time has expired).

Further, order management module 608 may also react to receiving PDDs or estimated delivery dates from system 100. For example, in response to receiving estimated delivery date, order management module 608 may prepare an electronic message for a selected fulfillment center. This preparatory message may be configured to be deployed if an order is received. In this way, online modules 600 may prepare for potential orders and facilitate meeting the a PDD by minimizing delays between order and transmission to fulfillment centers. In some embodiments, order management module 608 may be coupled to SAT system 101 (FIG. 1A) and the preparatory message may be forwarded to SAT system 101 as soon as an order is received. Moreover, shopping cart module 610 may generate a script for updating cart webpages using the delivery date information. For example, shopping cart module 610 may modify cart webpages to include timers and/or counters based on the expiration times of the estimated delivery dates.

Figure 7:
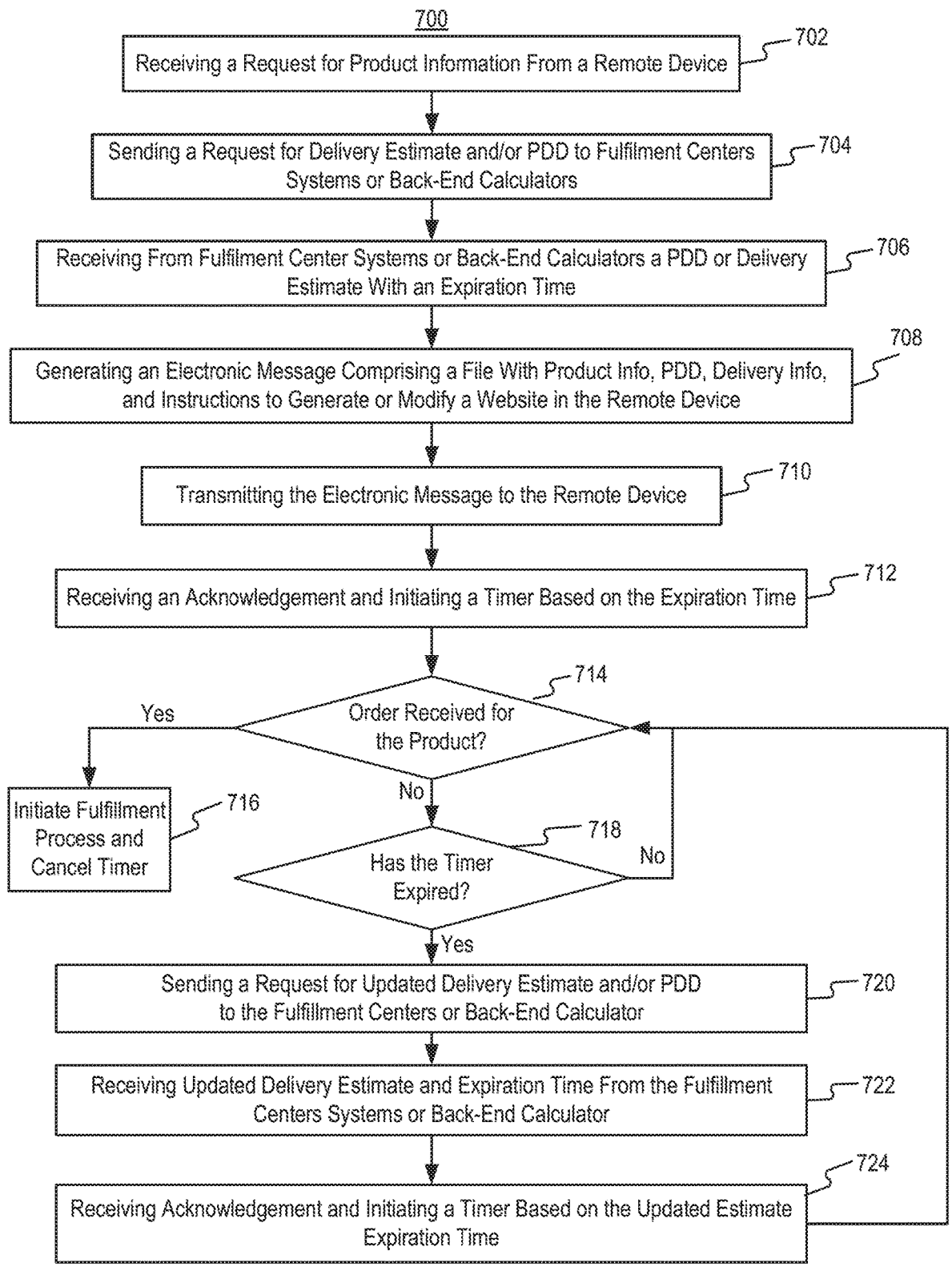
FIG. 7 is a flow chart of an exemplary process for handling a request for product delivery estimate, consistent with disclosed embodiments.

FIG. 7 is a flow chart of an exemplary process 700 for handling a request for product delivery estimate, consistent with disclosed embodiments. In some embodiments, elements of system 300 may perform process 700. For example, as disclosed in the steps description below, estimation systems 320 may perform process 700. This is just an illustrative example of process 700, however, and in other embodiments system 100, or parts of system 100, may perform process 700. For example, Shipment Authority Technology System 101, FO System 113, and/or FC Auth 123 (FIG. 1A) may perform one or more of the steps in process 700.

In step 702, estimation systems 320 may receive a request for product information from a remote device. For example, as a user of client devices 350 navigates in a webpage, client devices 350 may send a request for product information to estimation systems 320. Moreover, the request may include a username, a postal code, and a physical location. Alternatively, or additionally, estimation system 320 may receive the request from online resources 340. Online resources 340 may communicate with estimation systems 320 to request product and estimated delivery information to prepare webpages. Further, online modules 600 may send requests for product information, estimated delivery, and/or product availability.

In step 704, estimation systems 320 may send a request for delivery estimate based on the information received from the request in step 702. Estimation systems 320 may prepare and send a request to other elements of system 300 or system 100. For example, estimation systems 320 may prepare a request for estimated delivery and PDD for FO system 113. In such embodiments, the FO system 113 may act as a second system that includes in-memory storage comprising multiple delivery dates for different products that have been previously calculated. Alternatively, or additionally, estimation systems 320 may include front-end and a back-end portions. In such embodiments, the front-end may be configured to receive and process requests while the back-end may be configured to compute PDD or estimate target deliveries. Like with FO system 113, the back-end portions of estimation systems 320 may include multiple delivery dates for different products to minimize calculations whenever a request is similar to a previous request that has not expired. In these embodiments, the front-end of estimation systems 320 may be configured to receive requests and immediately transmit them to the back-end portion of estimation systems 320, which performs the calculations for PDD or delivery date. Further, in some embodiments, the request for estimated delivery date may include the product info and customer info (such as the postal code associated with the user).

In some embodiments, the request for delivery estimate of step 704 may be directed to a specific type of fulfillment center. For example, the product information received with the request in step 702 may be associated with a specific product type (e.g., products such as fruits, vegetables, other type of produce and/or other perishable items). If the request for product information is associated with a specific product type, estimation systems 320 may tailor the request for delivery estimate for the product type and send it to a specific fulfillment center. For instance, when estimation systems 320 determine the client is requesting information for a specific product type, such as fruits, estimation systems 320 may associate a customer region with the remote device and determine a fulfillment center with the specific product type (i.e., a fulfillment center that carries the specific products) that serves the customer region. Estimation system 320 may then transmit the request for delivery estimate to the determined fulfillment center.

Moreover, in some embodiments the request for delivery estimate of step 704 may be directed to a specific fulfillment center based on the fulfillment center location or capacity. For example, some requests may be associated with specific delivery types and/or different customer experiences. These delivery types can provide different delivery window, customer delivery request/[reference, method etc. Thus, if the request for product information is associated with a specified delivery type or experience, estimation system 320 may create a specific request directed to fulfillment centers based on location.

Specific delivery types may trigger a delivery process or mechanism that differ from nonspecific delivery types. For example, estimation systems 320 may select fulfillment centers in system 300 based on an associated cutoff time for specific time deliveries. In such embodiments, estimation systems 320 may determine that products ordered from a fulfillment center before the cutoff time can be delivered to meet the specific delivery time. However, products ordered from the fulfillment center after the cutoff time cannot be delivered to meet the specific delivery time. Further, fulfillment centers in system 300 may have a designed coverage area. Based on fulfillment centers cut off times and coverage area, estimation systems 320 may route the request for product information to a specific fulfillment center in step 704

Arranging fulfillment centers with cutoff times and service regions for specific time deliveries, may allow estimation systems 320 to minimize network congestion when resolving specific time delivery requests. By performing determinations before transmitting requests to fulfillment center brokers, estimation systems 320 may be able to minimize the number of communications when handling specific time deliveries, which may be highly time sensitive. Moreover, such embodiments allow estimation systems 320 to offer specific delivery time services for as long as possible and covering a large area, without missing delivery timelines due to distance. Thus, the disclosed segmentation of fulfillment centers not only reduces network congestion, it also facilitates processing specific time deliveries.

In step 706, estimation systems 320 may receive a delivery estimate or PDD. For example, estimation systems 320 may receive a PDD from FO system 113. Alternatively, if a similar request has been previously issued and stored in database 380, estimation systems 320 may receive the PDD from database 380. Further, in embodiments where the estimation systems 320 has a back-end calculator and a front-end gateway, the front-end portion of estimation systems 320 may receive the calculated estimated delivery from the back-end portions. The delivery estimate or PDD received in step 706 may include an expiration time that specifies when the order needs to be received in order to meet the PDD or have a valid predicted delivery date. Thus, the estimated delivery may include a conditional expiration time that specifies when is the deadline to guarantee the delivery. For example, the estimated delivery time may be "Monday 20:00" with an expiration time of "30 min." In this example, the PDD can only be guaranteed to be "Monday 20:00" if the order is received within 30 min. Otherwise, the estimated delivery date has expired and the PDD is no longer valid.

In step 708, estimation systems 320 may generate an electronic message including the estimated delivery date. The electronic message may be formatted specifically for the remote systems that generated the query in step 702. For example, estimation systems 320 may generate an electronic message for client devices 350 when they request the product information. The electronic message may include a TCP/IP message, SMS message, or other similar electronic communications. The electronic message generated in step 708 may include an HTML File or JavaScript with product information and delivery information, as further described in connection to FIG. 15. In some embodiments, the HTML file may include the product information, the delivery date estimate, and instructions to modify the webpage. In such embodiments, the modification instructions may include identifying the webpage's type (the webpage's type being one of a search result page, a single detail page, a cart page, or an order page) and modifying the webpage based on the webpage's type.

Moreover, the electronic message of step 708 may specify instructions to generate or modify a webpage in the remote device. In some embodiments, the HTML File or JavaScript may be configurable to modify webpages instead generating a new one. For example, when a user of client devices 350 is browsing a webpage that displays products, like described in FIG. 1B, the electronic message may include instructions to modify the webpage; instead of sending updated versions of the webpage as estimated deliveries are computed. Such embodiments may improve the technical field of generating dynamic webpages by minimizing network congestion.

Furthermore, in embodiments in which the product information is associated with specific product types, the electronic message may include instructions to modify the webpage by showing or removing certain products. For example, in step 706 estimation systems 320 may receive information that the product requested is not available in the fulfillment center servicing the customer region associated with the remote device. In such embodiments, the electronic message may include instructions to modify the website and show the specific product type as no longer available. in such embodiments, the electronic message may also include instructions to show alternative products. For instance, if the product information requested in step 702 was related to mozzarella cheese (a fresh product) but mozzarella cheese is no longer available, estimation systems 320 may generate an electronic message with instructions to modify the website by showing alternative products that are available, such as different types of cheese. Alternatively, if the specific product is available in the specific fulfillment center servicing the customer region, the electronic message may include instructions to modify item icons to include fresh logos or "in stock" indicators. Moreover, in some embodiments the instructions to modify the website may include modifying product icons to include specific product type or specific delivery time indicators based on the product information.

In step 710, estimation systems 320 may transmit the electronic message of step 708 to the remote device. For example, the HTML or JavaScript files generated in step 708 may be transmitted to client devices 350 when client devices 350 request the product information.

In embodiments that employ specific time delivery options, estimation systems 320 may perform specific instructions to communicate with users in step 710. For example, when a user of client devices 350 is set to receive a specific time delivery, estimation systems 320 may activate two settings. First, estimation systems 320 may identify products going to be delivered by a specific time and issue a promise of delivery, for example delivery by 7 AM. Further, estimation systems 320 may modify graphical user interfaces, as further described in connection with FIG. 12, to indicate the specific time delivery promise. Second, when fulfilling specific time deliveries, estimation system 320 may program a messaging service (such as Google Cloud Messaging (GCM) or Apple Push Notification service (APNs)) to send a push notification at a predefined time to customers. In such embodiments, estimation systems 320 may program push notifications to include delivery info, photos of the delivered package, and/or data associated with delivery. Further, estimation systems 320 may program and generate push/text notifications based on user preferences that can be set during checkout. For example, a user may select the time of the push notification, or whether the user wants an SMS in addition to the push notification. In such embodiments, a possible user selection for notification is to only receive push notifications and only after 7 AM (which may also be the default if the user does not make any selection). An alternative user selection may include receiving both push notifications and SMS immediately after the package is delivered, even if the delivery is scheduled at, for example, 4 AM.

In step 712, estimation systems 320 may receive an acknowledgement. For example, estimation systems 320 may receive an acknowledgement from client devices 350 that the electronic message was received. Further, based on receiving the acknowledgement, estimation systems 320 may initiate a timer based on the expiration time. With this configuration, estimation systems 320 may save resources on the number of timers that need to be employed to monitor expiration of estimated delivery dates. Instead of immediately starting timers for estimated delivery dates or PDDs, estimation systems 320 may minimize utilization of computational resources by only initiating timers when client devices 350 acknowledge they received and/or displayed the estimated delivery.

In step 714, estimation systems 320 may determine whether an order for a product has been received. For example, estimation systems 320 may review order requests in order data streams to determine if the customer associated with the remote device has completed the order. If estimation systems 320 determine an order has been received (step 716: yes), estimation systems 320 may continue to step 716 an initiate a fulfillment process. Thus, estimation systems 320 may send instructions to a fulfillment center to ship the product or initiate the process to fulfill the order. For example, estimation systems 320 may engage with SAT system 101 to begin processing the order. Further, in step 716 estimation systems 320 may cancel timers associated with the order to release computing resources.

However, if estimation systems 320 determine an order has not been received (step 716: no), estimation systems 320 may continue to step 718. In step 718, estimation systems 320 may determine whether the time has expired. For example, if the delivery estimate received in step 706 was associated with an expiration time of one hour, in step 718 estimation systems 320 may determine whether an hour has lapsed since the delivery estimate was received. If estimation systems 320 determine that the expiration time has not lapsed (step 714: no), estimation systems 320 may return to step 714 and continue monitoring whether an order has been received for the product and cycle between steps 714 and step 718. However, if estimation systems 320 determine the expiration time lapsed (step 714: yes), estimation systems 320 may continue to step 720 and send a new request for updated delivery estimate. For example, estimation systems 320 may send a request for updated delivery estimates to the fulfillment centers or to a back-end portion of the estimation systems 320.

In some embodiments, requesting an updated PDD or delivery estimate in step 720 may include identifying fulfillment centers based on the remote device information, requesting available inventory from identified fulfillment centers, and selecting a fulfillment center from the identified fulfillment centers based on a match between corresponding available inventory and the product identification.

In step 722, estimation systems 320 may receive an updated delivery estimate from fulfillment center or back-end calculator portion of the system. For example, because the first delivery or PDD estimate expired, estimation systems 320 may receive an updated delivery estimate or PDD that is later than the first delivery estimate received in step 706. If the initial delivery estimate was "Monday at 20:00" the second delivery estimate may be "Tuesday at 10:00." This second delivery may also include an expiration time. Nevertheless, in some situations the second delivery estimate received in step 722 may be the same but include an updated expiration time.

In some embodiments, steps 720 and 722 may be executed by performing operations of determining the estimate expiration for the first delivery estimate lapsed, providing (to a second system such as FO systems 113) a third request for a second delivery date estimate, receiving (from the second system) the second delivery date estimate, and generating a second electronic message comprising instructions to modify the webpage by substituting the first delivery date estimate with the second delivery date estimate.

In step 724, like in step 712, estimation systems 320 may receive an acknowledgement and initiate a timer based on the new expiration time. Moreover, estimation systems 320 may return to step 714 to monitor the order and delivery date estimates and initiate fulfillment process or request, again, an update for the delivery estimate when the expiration lapses.

Figure 8:
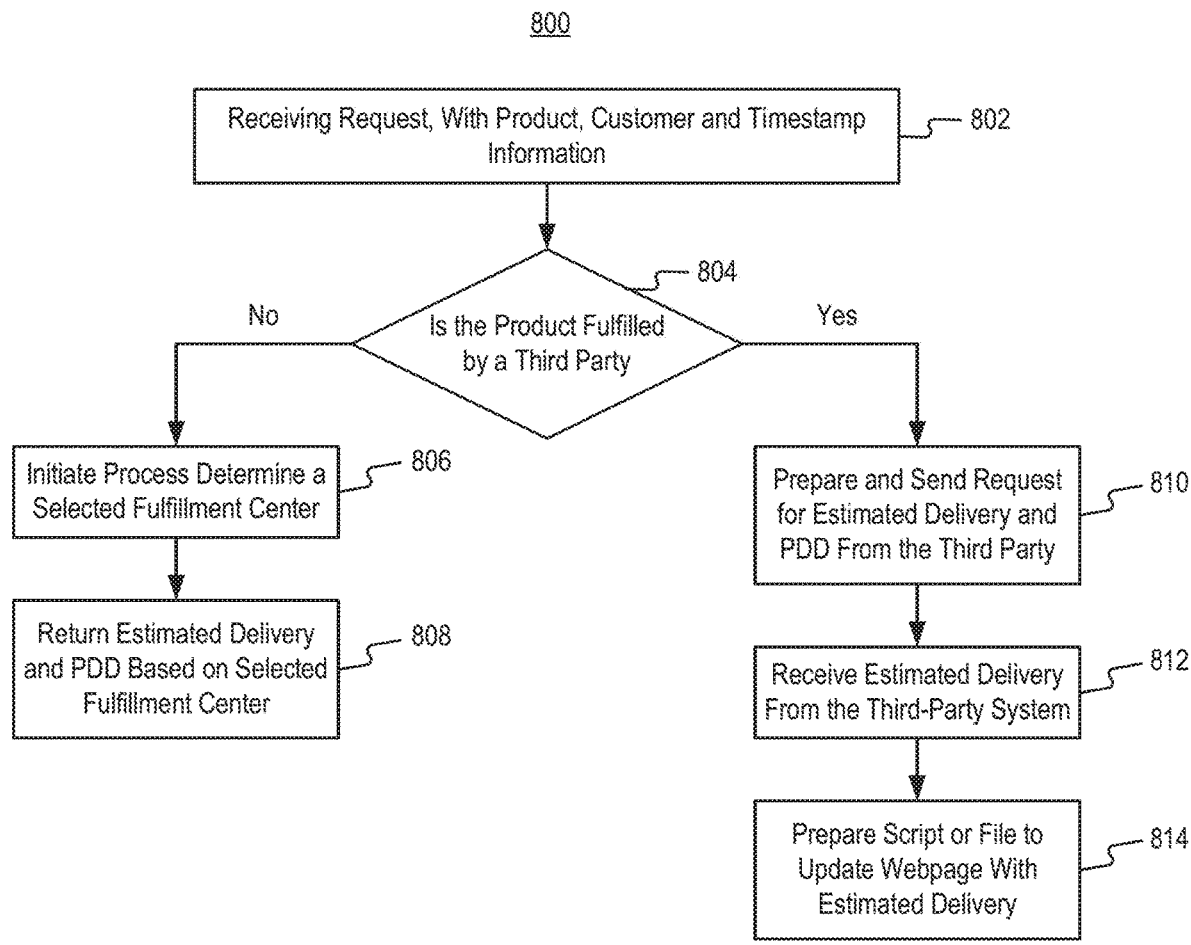
FIG. 8 is a flow chart of an exemplary process for handling estimate requests of products fulfilled by third parties, consistent with disclosed embodiments.

FIG. 8 is a flow chart of an exemplary process 800 for handling estimate requests of products fulfilled by third parties, consistent with disclosed embodiments. In some embodiments, elements of system 300 may perform process 800. For example, as disclosed in the steps description below, estimation systems 320 may perform process 800. Alternatively, or additionally, third-party systems 360 may perform process 800, or parts of process 800. Further, in other embodiments system 100, or parts of system 100, may perform process 800. For instance, FO system 113 and 3PL systems 121 may perform process 800.

In step 802 of process 800, estimation systems 320 may receive a request for product information including product, customer, and timestamp information. For example, estimation systems 320 may receive a request for product information from client devices 350. The request may also include customer information, such as a postal code, and a timestamp of when the request was generated.

In step 804, estimation systems 320 may determine whether the product would be fulfilled by a third party. For example, estimation systems 320 may determine the product is unavailable in local inventory and would need to be fulfilled by a third party. Alternatively, or additionally, estimation systems 320 may determine the product is normally fulfilled by third parties by default, without requiring an inventory query.

If estimation systems 320 determine the product is not fulfilled by a third party (step 804: no), estimation systems 320 may continue to step 806 and initiate the process to determine a selected fulfillment center. For example, as further described in connection to FIG. 9, based on the postal code of the customer, product availability, and fulfillment center capacity, estimation systems 320 may identify a fulfillment center that has a priority to complete an order. In step 808, estimation systems 320 may send an estimated delivery based on the selected fulfillment center. For example, once a fulfillment center is identified in step 806, estimation systems 320 may determine a delivery date estimate and send it to client devices 350 for display to customers.

However, if estimation systems 320 determine the product is fulfilled by a third party (step 804: yes), estimation systems 320 may continue to step 810 and prepare a request for estimated delivery or PDD from the third party. For example, in step 810 estimation systems 320 may prepare and send a request for PDD to third-party systems 360 or 3PL systems 121. The request sent to the third party may include the product information and customer information (e.g., customer's postal code).

In step 812, estimation systems 320 may receive the estimated delivery date from third parties that may fulfill an order for the product requested in step 802. For instance, estimation systems 320 may receive a PDD and delivery estimate information from one of third-party systems 360.

In step 814, estimation systems 320 may prepare an electronic message including a JavaScript or HTML file to update or generate webpages including the estimated delivery date and/or time. The electronic message may then be submitted to the requester of product information in step 802.

Steps in process 800 may be stored in a memory device of estimation systems 320, which may include instructions to determine, by consulting a database (such as databases 180), whether delivery of the product will be fulfilled by a third party. Estimation systems 320 may also, based on determining that the delivery of the product will be fulfilled by a third party, provide the request for a delivery date estimate to a system associated with the third party. Further, based on determining that the delivery of the product will not be fulfilled by a third party, estimation systems 320 may provide the request for a delivery date estimate to a system that pre-stores a plurality of delivery date estimates in memory.

Figure 9:
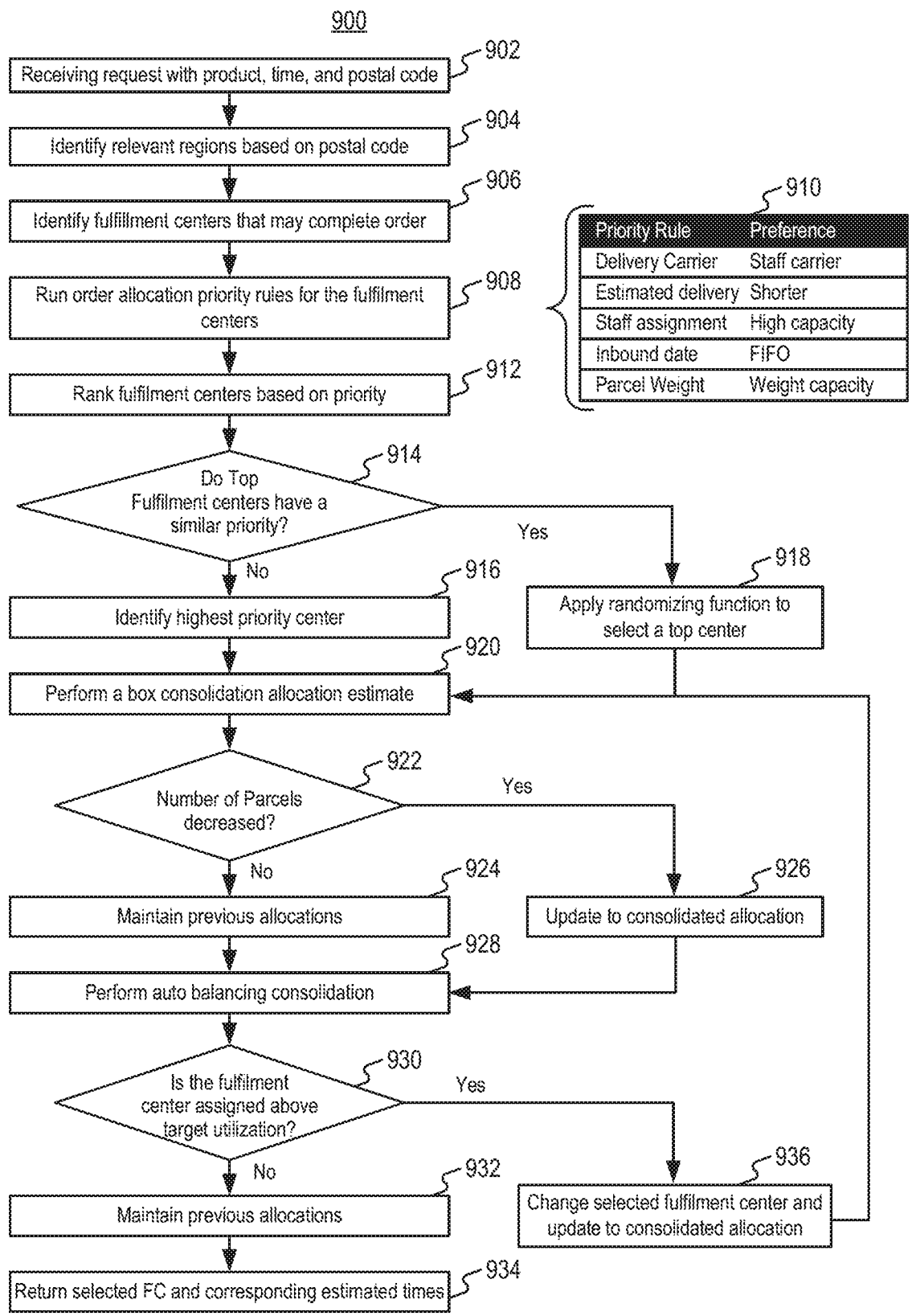
FIG. 9 is a flow chart of a delivery date estimation process, consistent with disclosed embodiments.

FIG. 9 is a flow chart of a delivery date estimation process 900, consistent with disclosed embodiments. In some embodiments, elements of system 300 may perform process 900. For example, as disclosed in the steps description below, estimation systems 320 may perform process 900. This is only an illustrative example of process 900, however, and in other embodiments system 100, or parts of system 100, may perform process 900. For example, FO System 113 and/or FC Auth 123 (FIG. 1A) may perform one or more of the steps in process 900.

In step 902, estimation systems 320 may receive a request for delivery estimate information and/or PDD. The request may include product, time, and postal code information. Based on the information in the request, estimation systems 320 may identify relevant geographical regions in step 904. For example, estimation systems 320 may identify regions that may fulfill a potential order for the product based on the customer's postal code.

In step 906, estimation systems 320 may identify fulfillment centers that may complete a potential order for the product. In some embodiments, the region identified in step 904 may include multiple fulfillment centers. In such embodiments, estimation systems 320 may filter fulfillment centers based on ability to meet a PDD or availability of the requested product.

In some embodiments, identifying which fulfillment centers may complete the potential order may be based on the type of product and/or order that is associated with the product. In step 906 estimation systems 320 may determine whether the product identification is associated with a specific product type or a specific delivery time product and identify fulfillment centers based on the availability of specific product types or the fulfillment center location with respect to the destination address. For example, when the product identification is associated with a specific product type, estimation system 320 may perform operations of identifying fulfillment centers serving a region associated with the remote device, requesting available specific product type inventory from fulfillment centers, and selecting one of the fulfillment centers. Alternatively, or additionally, when the product identification comprises a specific delivery time product, estimation systems 320 may perform operations of identifying a closest fulfillment center to the remote device, determining a cutoff based on the region and a distance between the remote device and the closest fulfillment center, and selecting the closest fulfillment center when the cutoff has not lapsed, in step 906.

In step 908, estimation systems 320 may run order allocation priority rules for the fulfillment centers. In some embodiments, the allocation priority rules may be stored in memory devices within estimation systems 320, which may retrieve allocation rules specific for the identified region(s) in step 904. Alternatively, or additionally, the allocation priority rules may be stored in database 380, and estimation systems 320 may query the data base once fulfillment centers have been identified in step 906. In yet other embodiments, the allocation rules may be stored in elements of system 100. For instance, the allocation rules may be stored in FO system 113.

The order allocation rules may generate a priority score for each fulfillment center in the region. As shown in table 910, the priority allocation rules may include several rules with different preferences. For example, the order allocation rules may include a rule for delivery carrier that has a preference for staff carriers. That is, fulfillment centers in the region that have carriers on staff are preferred over fulfillment centers that do not have staff carriers and would need to contract with third-party carriers. Further, the order allocation rules may include an estimated delivery. Based on historic trends and an association of the product and each fulfillment center, the allocation rules may estimate a tentative delivery and give preference to fulfillment centers with shorter delivery dates. The rules may also include a staff assignment rule that gives preference to fulfillment centers in which staff has high staff availability or capacity. Moreover, the rules may also include a consideration for inbound date of the parcel to fulfillment center. With this rule the system may give preference to fulfillment centers that would receive the packet first to increase delivery certainty. Finally, the rules may also include preferences based on parcel weight. Some fulfillment centers may be better equipped to handle heavy or large parcels and may get preference for heavier parcel.

With the considerations of allocation rules in table 910, estimation systems 320 may rank fulfillment centers based on the calculated priority in step 912. For example, all the fulfillment centers in the region may be assigned a priority score and the fulfillment centers may be ranked based on the priority score.

In step 914, estimation systems 320 may determine whether top fulfillment centers have a similar priority. For example, estimation systems 320 may determine whether priority scores of fulfillment centers are within a threshold. If the top fulfillment centers do not have a similar priority (step 914: no), estimation systems 320 may continue to step 916 and identify the fulfillment center with the highest priority. However, if the top fulfillment centers have a similar priority (step 914: yes), estimation systems 320 may continue to step 918 an apply a randomizer function to select a top fulfillment center. The randomizer function may facilitate even distribution of load throughout fulfillment center without much required computation.

In step 920, estimation systems 320 may perform a box consolidation allocation estimate. With the selected fulfillment center, estimation systems 320 may determine costs of shipment from the fulfillment center, including the number of boxes that would be used for shipping. To minimize cost and improve efficiency, in step 920 estimation systems 320 may perform a box consolidation to attempt to reduce the number of boxes or parcels for the tentative order of the product received in step 902.

In step 922, estimation systems 320 may determine whether the number of parcel or boxes decreased with the box consolidation. If the number of parcels does not decrease (step 922: no), estimation systems 320 may continue to step 924 and maintain the previous allocations. However, if the number of parcels decreases after the box consolidation (step 922: yes), estimation systems 320 may continue to step 926 and update the allocation to the consolidated allocation.

In step 928, estimation systems 320 may perform an auto balancing consolidation. The auto balancing consideration may attempt to balance the load in different fulfillment centers of the region identified in step 904. With the goal of avoiding overburdening a specific center, estimation systems 320 may perform an auto balancing that attempts to improve utilization of resources in different fulfillment centers.

In step 930, based on the auto balancing consolidation, estimation systems 320 may determine whether the fulfillment center that was assigned, in steps 916 or 918, is above a target utilization. If estimation systems 320 determines the fulfillment center is not above the target utilization (step 930: no), estimation systems 320 may continue to step 932 and maintain the previous allocation. However, if estimation systems 320 determines the fulfillment center is above the target utilization (step 930: yes), estimation systems 320 may continue to step 936 and change the selected fulfillment center to avoid overburdening the selected fulfillment center. In some embodiments of process 900, estimation systems 320 may return to step 920 after step 936 to re-run the box and auto balancing consolidations for the newly selected fulfillment center.

In step 934, estimation systems 320 may transmit the selected fulfillment center and corresponding estimated times to the requester of step 902. In some embodiments, the PDD or estimated delivery times may be pre-generated for the selected fulfillment center. For example, the PDD may be pre-selected based on a delivery date estimate associated with the fulfillment center, an order priority, an inbound date for the product, a postal code for delivery, or a quantity associated with the product.

Figure 10:
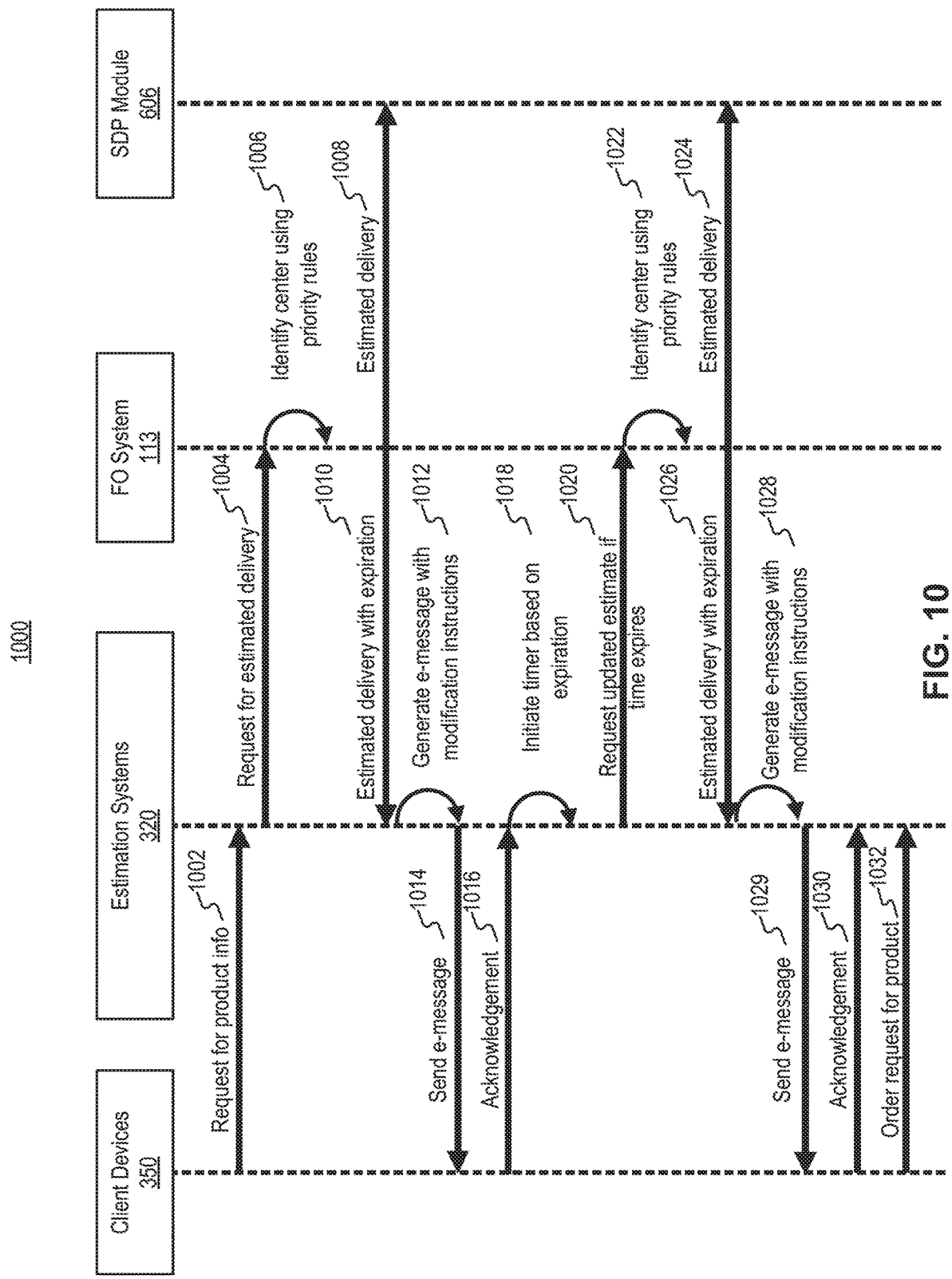
FIG. 10 is a process flow diagram of an exemplary webpage modification process, consistent with disclosed embodiments.

FIG. 10 is a process flow diagram of an exemplary webpage modification process 1000, consistent with disclosed embodiments. As shown in FIG. 10, process 1000 may be performed by elements of both system 100 and system 300, having intersystem communications to complete process 1000. In other embodiments, however, process 1000 may be performed by elements of system 300 alone, or system 100 alone. For example, in some embodiments the operations from FO system 113 and SDP module 606 may be performed by estimation systems 320, resulting in a process uniquely performed by system 300. Alternatively, elements in system 100 may performed operations shown for elements of system 300. For example, operations by client devices 350 may be performed by user devices 102 and operations by delivery estimation systems 320 may be performed by internal front-end system 105.

In step 1002, client devices 350 may request product information to estimation systems 320. As previously discussed in connection to FIG. 7, the request may include product information, customer information, a timestamp of the request.

In step 1002, and in response to the request from client devices 350, estimation systems 320 may send a request to estimated delivery 1004 to FO system 113. In some embodiments, FO system 113 may be associated with a single fulfillment center. In other embodiments, however, FO system 113 may be associated with a region that controls multiple fulfillment centers and can allocate deliveries.

In step 1006, FO system 113 may identify a fulfillment center using priority rules. For example, as discussed in connection with table 910 (FIG. 9), FO system 113 may perform a series of operations to identify a fulfillment center with high priority, run box consolidation, and perform auto balancing consolidation, to determine which fulfillment center in a region could fulfill a request for the order.

In steps 1008 and 1010, FO system 113 may send estimated delivery dates or PDDs to SDP module 606 and estimation systems 320 respectively. Each one of the messages in steps 1008 and 1010 may also an expiration date for the delivery date estimate.

Based on the information received in step 1008, SDP module 606 may prepare a webpage and store it for future requests with similar product and customer information. In contrast, based on the information received in step 1010, estimation systems 320 may generate an electronic message in step 1012. The electronic message may include instructions to modify existing webpages or to display the estimated delivery date, PDD, and/or expiration time in a webpage.

In step 1014, estimation systems 320 may send the electronic message to client devices 350 and receive, in response, an acknowledgement message in step 1016. Moreover, in response to the acknowledgement, estimation systems 320 may initiate a timer based on the expiration time in step 1018. To monitor delivery dates and guarantee that users are observing accurate information, estimation systems 320 may initiate a timer to cancel expired delivery estimates and/or request updates for delivery estimates and PDDs.

In step 1020, estimation systems 320 may request an updated estimate to FO system 113 if the time expires. For example, if the expiration time received in step 1010 is 30 minutes, estimation systems 320 may request an updated PDD 30 min after of the acknowledgement in step 1016.

In step 1022 FO system 113 may repeat the process of step 1006 to identify a fulfillment center using priority rules and determine an estimated delivery and corresponding expiration, which is transmitted to SDP module 606 and estimation systems 320 in steps 1024 and 1026, respectively. The estimation systems 320 may generate a new electronic message with modification instructions in step 1028. The modification instructions may specify the updated PDD, estimated delivery, and expiration.

In step 1029, estimation systems 320 may send the electronic message to client devices 350 and receive an acknowledgement message in step 1032. In exemplary process 1000, in step 1032 client devices 350 may send a request for product in step 1032 finalizing the need for updated estimated delivery displays. In such embodiments, estimation systems 320 may engage with SAT system 101 (FIG. 1A) to process the order.

Figure 11:
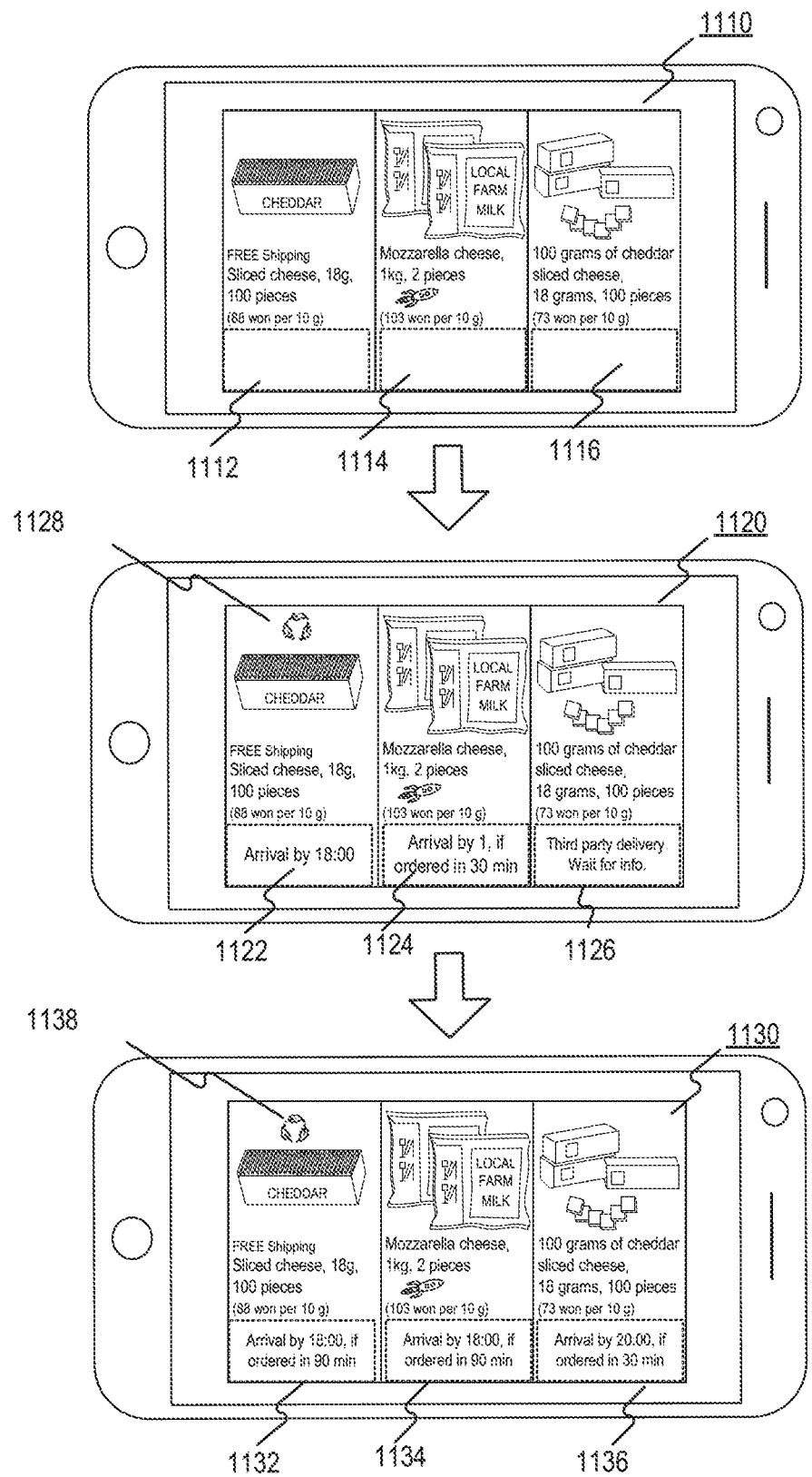
FIG. 11 is a front view of a sequence of search result webpage exemplary graphical user interfaces in a mobile device, consistent with disclosed embodiments.

FIG. 11 is a front view of a sequence of search result page exemplary graphical user interfaces (GUIs) in a mobile device, consistent with disclosed embodiments. FIG. 11 shows three GUIs in a mobile device that may be displayed in client devices 350 and/or user devices 102.

GUI 1110 shows a search result page displaying three products. Each product includes an image description, a text description, and a dynamic textbox. Dynamic text boxes 1112, 1114, and 1116 may be configurable to display electronic messages from, for example, estimation systems 320. As shown in FIG. 11, in the GUI 1110 the dynamic text boxes are empty. The text boxes may be empty because the estimated deliveries for each one of the product has not been computed. However, in order to minimize latency an enhance user experience, the webpage may be showed to the client device without that information and simply reserve screen space with placeholders.

GUI 1120 shows the same three products but in this case the dynamic text boxes have been modified or updated to show estimated delivery times. Dynamic textbox 1122 replaces dynamic text box 1112 and displays an estimated delivery of "Arrival by 18:00." New dynamic textbox 1124 shows both the estimated arrival and expiration time, displaying "Arrival by 1, if ordered in 30 min." In contrast, dynamic textbox 1126 does not display information because it is being retrieved from a third party. For example, as discussed in connection with FIG. 8, the third product in GUI 1120 may be fulfilled by a third party and estimated delivery needs to be accessed from the third party. Moreover, in GUI 1120 some of the product icons may be modified to include additional icons to indicate a product type. For example, products in GUI 1120 may be indicated with specific product type icon 1128, to show the product is available from a fulfillment center.

GUI 1130 shows the same three products, but the dynamic text boxes have updated information. Dynamic textbox 1132 displays "Arrival by 18:00, if ordered in 90 min," adding an expiration time to the estimated delivery that was displayed in dynamic textbox 1122. Dynamic textbox 1134 now displays "Arrival by 18:00, if ordered in 90 min." GUI 1130 may be updated after the 30 min expiration from dynamic textbox 1124 has lapsed. Thus, in GUI 1130 dynamic textbox 1134 may show updated information for the second product. Further, dynamic textbox 1136 now displays "Arrival by 20:00, if ordered in 30 min." This information of estimated delivery and expiration time may have been obtained from a third party and now replaces the previous dynamic text box 1126. Moreover, GUI 1130 may also show specific product type icon 1138 being associated with products that are available from fulfilment centers.

Figure 12:
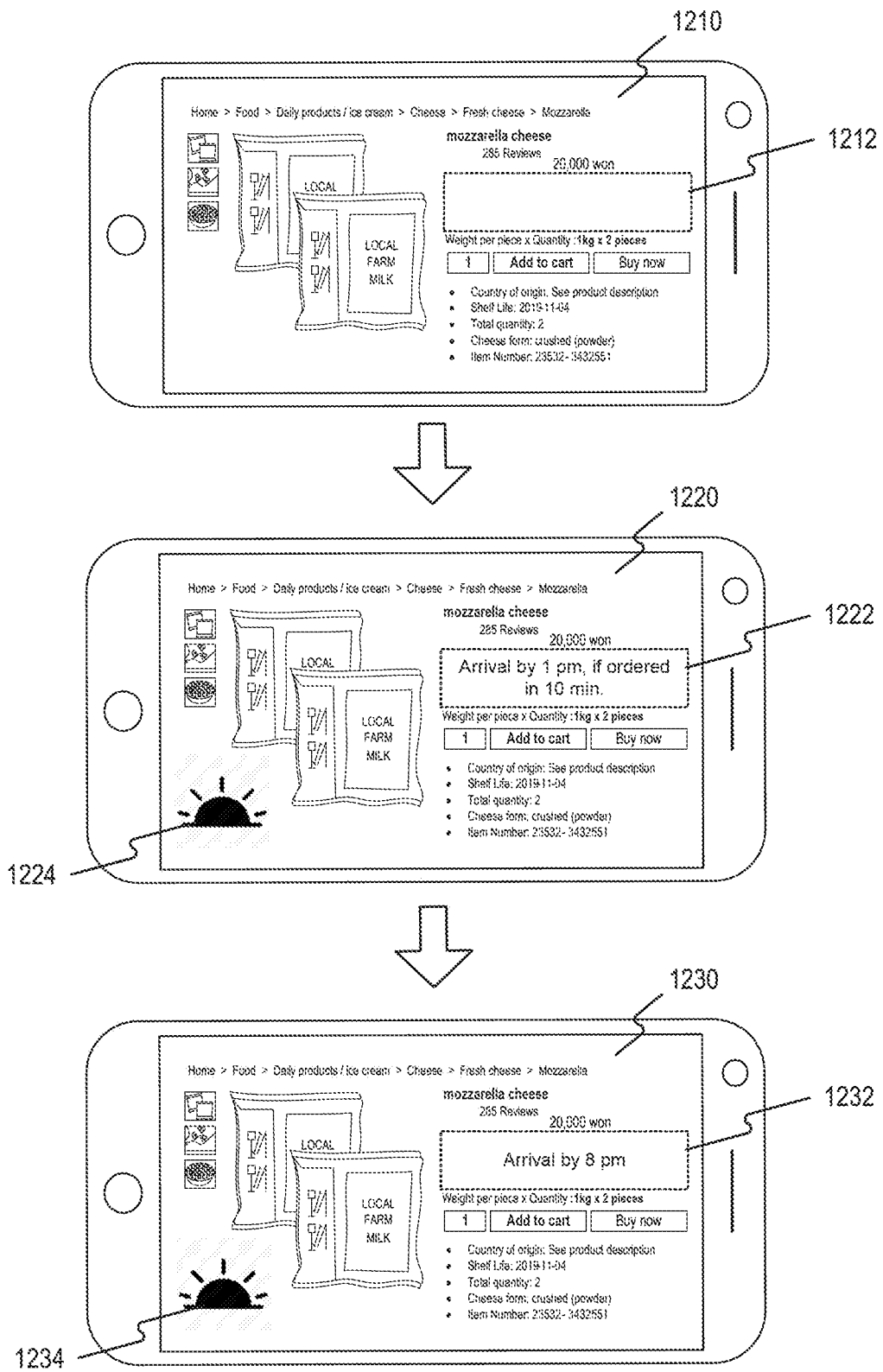
FIG. 12 is a front view of a sequence of single display webpage exemplary graphical user interfaces in a mobile device, consistent with disclosed embodiments.

FIG. 12 is a front view of a sequence of Single Display Page exemplary graphical user interfaces in a mobile device, consistent with disclosed embodiments. FIG. 12 shows three graphical user interfaces (GUIs) that may be displayed in client devices 350 and/or user devices 102.

GUI 1210 shows a single product with a graphical description, text description, order information, and a dynamic text box. The dynamic textbox 1212 in GUI 1210 is empty. In some embodiments, dynamic textbox 1212 may be empty awaiting for calculations by estimation systems 320.

GUI 1220 shows the same single product information but dynamic textbox 1212 has been substituted by dynamic text box 1222, which now specifies both estimated delivery date and expiration, displaying "Arrival by 1 pm, if ordered in 10 min." In some embodiments, electronic messages generated by estimation systems 320 may include instructions to update dynamic textbox 1212 to dynamic textbox 1222. Moreover, in GUI 1220 the product display may be modified to include additional icons to indicate available delivery service. For example, the product displayed in GUI 1120 may be updated to show a specific time delivery icon 1224, to show the product is available for specific time delivery based on cutoff and proximity to fulfillment centers. In some embodiments, specific time delivery icon 1224 may include information specific to the product or the tentative delivery date/time. For example, specific time delivery icon 1224 may include a message such as "before dinner," based on determinations from estimation systems 320.

GUI 1230 shows the single product information but dynamic text box 1222 has been updated to dynamic textbox 1232. For example, the expiration time of 10 min may have lapsed from GUI 1220 to GUI 1230. Thus, estimation systems 320 may have sent instructions to update the delivery estimate from 1 pm to 8 pm. Moreover, GUI 1230 may also show specific time delivery icon 1234 displayed on products that can be delivered by a specific time next day.

Figure 13:
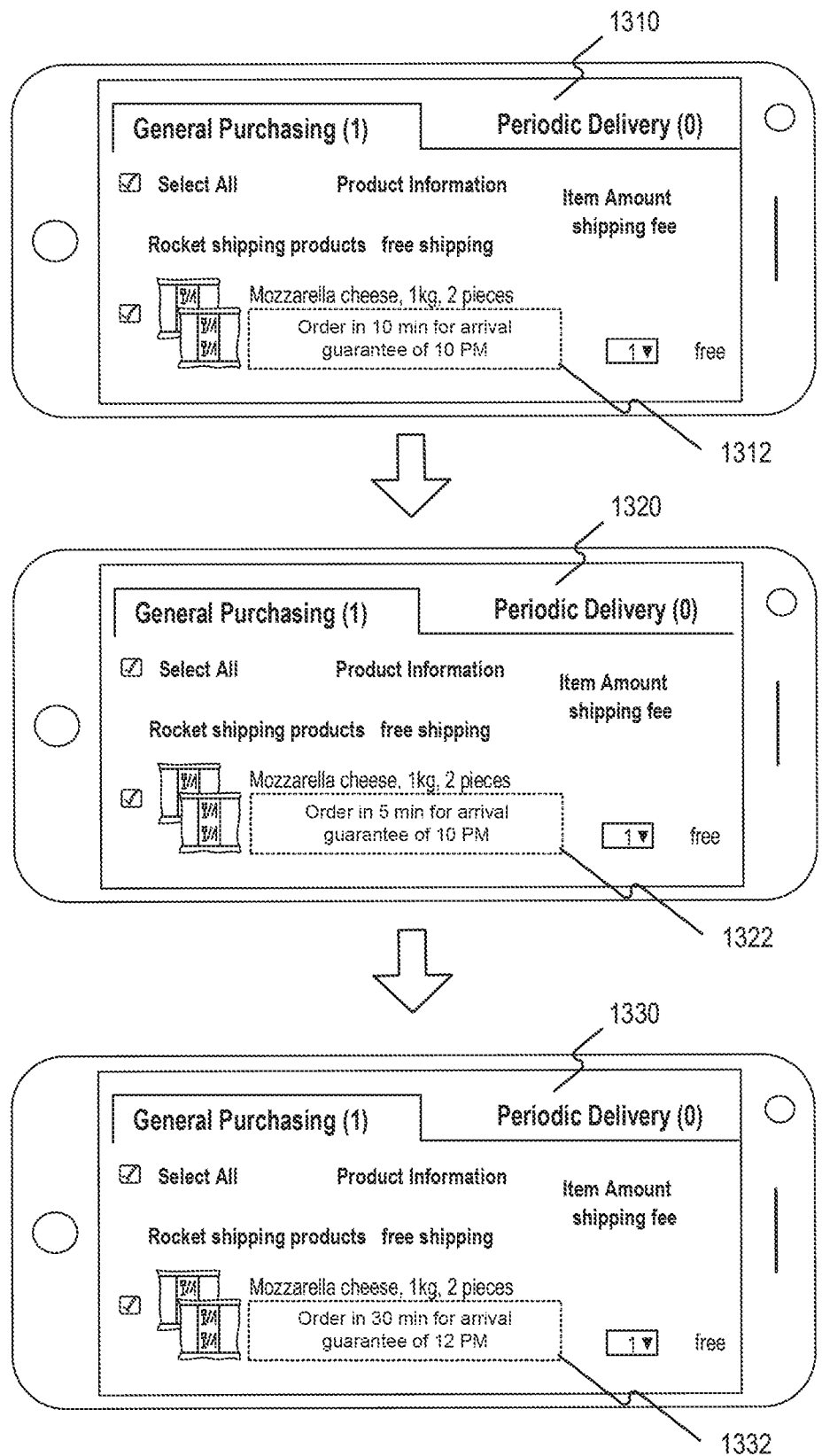
FIG. 13 is a front view of a sequence of cart webpage exemplary graphical user interfaces in a mobile device, consistent with disclosed embodiments.

FIG. 13 is a front view of a sequence of cart page exemplary graphical user interfaces in a mobile device, consistent with disclosed embodiments. FIG. 13 shows three graphical user interfaces (GUIs) that may be displayed in client devices 350 and/or user devices 102.

GUI 1310 shows a cart page with products in a customer's cart. GUI 1310 may include graphical descriptions, text descriptions, order information, and a dynamic text box. The dynamic textbox 1312 in GUI 1210 shows the expiration time and estimated delivery, displaying "Order in 10 min for arrival guarantee of 10 PM."

GUI 1320 shows the same cart page but the dynamic box 1322 has an updated expiration time from 10 min to 5 min. In such embodiments, when the expiration time is close to be expired, client devices 350 may be configured to create a hybrid webpage having dynamic text boxes updating frequently to capture the user's attention. In this way, dynamic box 1322 may show accurate PDD times.

GUI 1330 shows the cart page but dynamic text box 1322 has been updated to dynamic textbox 1332, which now displays "Order in 30 min for arrival guarantee of 12 PM." For example, the expiration time of 5 min displayed in GUI 1320 may have lapsed from GUI 1320 to GUI 1330. Thus, estimation systems 320 may have sent instructions to update the delivery estimate.

Figure 14:
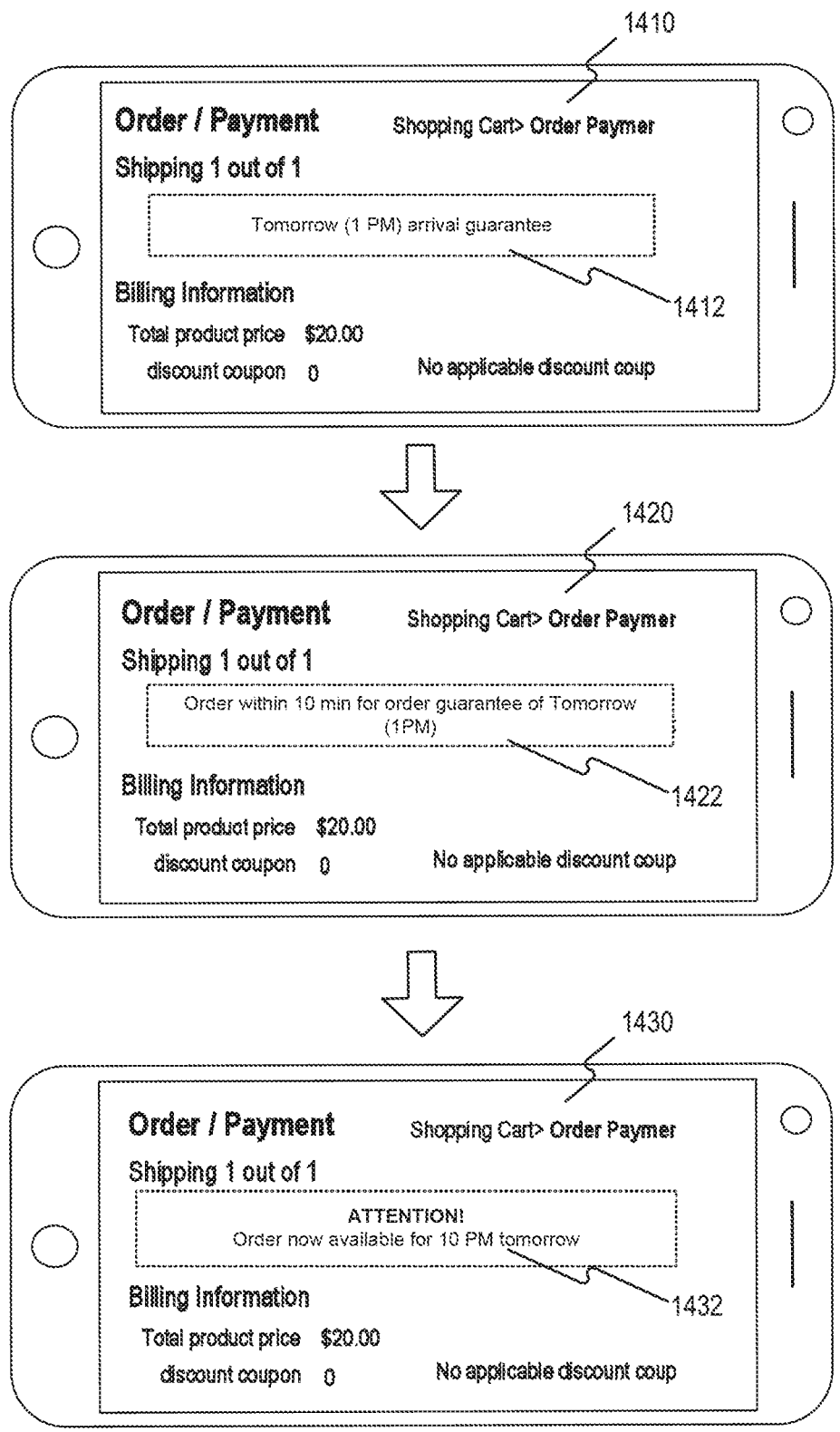
FIG. 14 is a front view of a sequence of order webpage exemplary graphical user interfaces in a mobile device, consistent with disclosed embodiments.

FIG. 14 is a front view of a sequence of order page exemplary graphical user interfaces in a mobile device, consistent with disclosed embodiments. FIG. 14 shows three graphical user interfaces (GUIs) that may be displayed in client devices 350 and/or user devices 102.

GUI 1410 shows an order page including order information and a dynamic text box. The dynamic textbox 1412 in GUI 1410 shows a PDD, displaying "Tomorrow (1 PM) arrival guarantee."

GUI 1420 shows the same order page but the dynamic textbox 1422 has the PDD with an updated expiration time, displaying "Order within 10 min for order guarantee of Tomorrow (1 PM)." In such embodiments, estimation systems 320 may have generated electronic messages with JavaScripts or HTML files to update dynamic textbox 1422 and include the expiration time of 10 min.

GUI 1430 shows the order page but dynamic text box 1422 has been updated to dynamic textbox 1432, which now displays "ATTENTION! Order now available for 10 PM tomorrow." In such embodiments, estimation systems 320 may prepare an electronic message that includes an alert. The alert may be configured to modify the webpage color, font size, and/or emit a sound.

FIG. 15 is an exemplary source code of a script configurable to generate or modify a webpage with delivery date estimates. Source code 1500 shows exemplary instructions and functions that may be employed to generate or modify a webpage to display estimated delivery, as described in connection with FIGS. 7 and 10. For example, electronic messages generated and transmitted by estimation systems 320 may include source code 1500. The syntax used in source code 1500 is exemplary and different syntaxis and functions can be also employed and/or substituted.

Source code 1500 may include headers 1501 including the html headers to identify and/or modify a webpage. Source code 1500 may also include a document type identification portion 1502. Portion 1502 may include functions to evaluate whether a webpage is a cart page, order page, search page, or single product page.

Source code 1500 may also include a dynamic textbox generation portion 1504. Functions and routines in portion 1504 may specify the messages and modification instructions, as discussed in connection to FIGS. 11-14. Further, source code 1500 may include a modification portion 1506 including options for modifications of the different webpages. Moreover, source code 1500 may include a timer portion 1508, which may include instructions to display a timer on the webpage that is correlated with expiration times of the estimated delivery times for products.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system comprising:
one or more processors; and
one or more memory devices storing instructions that, when executed by the one or more processors, configure the one or more processors to:
receive, from a first fulfillment center system, a delivery date estimate and a related expiration time for a product;

determine whether the first fulfillment center system has a utilization above a target based on an auto balancing consolidation;

in response to determining the first fulfillment center system has above target utilization, request the delivery date estimate and the related expiration time from a second fulfillment center system, different from the first fulfillment center system;

generate first instructions to modify a webpage based on a webpage type by including a product type indicator, a specific time delivery indicator, and an in stock indicator, the product type indicator indicating a product shelf life;

forward the first instructions to a client device and initiate a timer;

determine whether the delivery date estimate expired based on the related expiration time and the timer;

in response to determining the delivery date estimate expired, generate second instructions to modify the webpage, the second instructions comprising substituting the delivery date estimate with an updated delivery date estimate; and forward the second instructions to the client device and reset the timer based on the updated delivery date estimate, wherein the delivery date estimate is pre-generated based on: the first or second fulfillment center system fulfilling the product, a delivery date, an order priority, an inbound date for the product, a postal code for delivery, and a quantity associated with the product.

2. The system of claim 1, wherein the instructions further configure the one or more processors to determine the webpage type based on HTML headers in the webpage, the webpage type being selected from a group consisting of cart page, order page, search page, and single product page.

3. The system of claim 2, wherein when the webpage type is the single product page:
the specific time delivery indicator specifies products available for morning delivery; and
the first instructions comprise updating a dynamic text box displayed in the single product page.

4. The system of claim 1, wherein the second instructions further comprise modifying a dynamic text box using a script specifying an arrival time and a time condition.

5. The system of claim 1, wherein to generate the second instructions the one or more processors are configured to:
transmit a request for updated delivery estimates to back-end portions of the first or second fulfillment center system; and
receive the updated delivery date estimate along with a second expiration time.

6. The system of claim 5, wherein the instructions further configure the one or more processors to receive an acknowledgement from a client device and reset the timer based on the second expiration time.

7. The system of claim 1, wherein the first instructions and the second instructions each comprise an HTML file, the HTML file comprising a header section, an identification portion, a textbox generation portion, a modification portion, and a timer portion.

8. The system of claim 1, wherein the instructions further configure the one or more processors to:
determine whether an online order for the product has been received by reviewing order requests in an order data stream after generating the second instructions; and
in response to determining the online order has been received, initiate a fulfillment process by communicating with a shipment authority technology system in the first or second fulfillment center system.

9. The system of claim 1, wherein the instructions further configure the one or more processors to:
determine, by consulting a database, whether delivery of the product will be fulfilled by a third party;
in response to determining the delivery of the product will be fulfilled by the third party, provide a promised delivery date (PDD) request to the third party system; and
in response to determining the delivery of the product will not be fulfilled by the third party, provide the PDD request to a shipment authority technology system in the fulfillment center system.

10. A computer implemented method comprising:
receiving, from a first fulfillment center system, a delivery date estimate and a related expiration time for a product;
determining whether the first fulfillment center system has a utilization above a target based on an auto balancing consolidation;
in response to determining the first fulfillment center system has above target utilization, requesting the delivery date estimate and the related expiration time from a second fulfillment center system, different from the first fulfillment center system;
generating first instructions to modify a webpage based on a webpage type by including a product type indicator, a specific time delivery indicator, and an in stock indicator, the product type indicator indicating a product shelf life;
forwarding the first instructions to a client device and initiating a timer;
determining whether the delivery date estimate expired based on the related expiration time and the timer;
in response to determining the delivery date estimate expired, generating second instructions to modify the webpage, the second instructions comprising substituting the delivery date estimate with an updated delivery date estimate; and
forwarding the second instructions to the client device and resetting the timer based on the updated delivery estimate,
wherein the delivery date estimate is pre-generated based on: the first or second fulfillment center system fulfilling the product, a delivery date, an order priority, an inbound date for the product, a postal code for delivery, and a quantity associated with the product.

11. The method of claim 10, wherein the method further comprises determining the webpage type based on HTML headers in the webpage, the webpage type being selected from a group consisting of cart page, order page, search page, and single product page.

12. The method of claim 11, wherein when the webpage type is the single product page:
the specific time delivery indicator specifies products available for morning delivery; and
the first instructions comprise updating a dynamic text box displayed in the single product page.

13. The method of claim 10, wherein the second instructions further comprise modifying a dynamic text box using a script specifying an arrival time and a time condition.

14. The method of claim 10, wherein generating the second instructions comprise:

transmitting a request for updated delivery estimates to back-end portions of the first or second fulfillment center system; and receiving the updated delivery date estimate along with a second expiration time.

15. The method of claim 14, further comprising receiving an acknowledgement from a client device and resetting the timer based on the second expiration time.

16. The method of claim 10, wherein the first instructions and the second instructions each comprise an HTML file, the HTML file comprising a header section, an identification portion, a textbox generation portion, a modification portion, and a timer portion.

17. The method of claim 10, further comprising:

after generating the second instructions, determining whether an online order for the product has been received by reviewing order requests in an order data stream; and in response to determining the online order has been received, initiating a fulfillment process by communicating with a shipment authority technology system in the first or second fulfillment center system.

18. A device comprising:

at least one processor; and at least one memory storing instructions that, when executed, configure the at least one processor to perform operations comprising:

receiving, from a first fulfillment center system, a delivery date estimate and a related expiration time for a product;

determining whether the first fulfillment center system has a utilization above a target based on an auto balancing consolidation;

in response to determining the first fulfillment center system has above target utilization, requesting the delivery date estimate and the related expiration time from a second fulfillment center system, different from the first fulfillment center system;

generating first instructions to modify a webpage based on a webpage type by including a product type indicator, a specific time delivery indicator, and an in stock indicator, the product type indicator indicating a product shelf life;

forwarding the first instructions to a client device and initiating a timer;

determining whether the delivery date estimate expired based on the related expiration time and the timer;

in response to determining the delivery date estimate expired, generating second instructions to modify the webpage, the second instructions comprising substituting the delivery date estimate with an updated delivery date estimate; and forwarding the second instructions to the client device and resetting the timer based on the updated delivery date estimate, wherein the delivery date estimate is pre-generated based on: the first or second fulfillment center system fulfilling the product, a delivery date, an order priority, an inbound date for the product, a postal code for delivery, and a quantity associated with the product.

* * * * *